United States Patent
Wang et al.

(10) Patent No.: US 11,446,717 B2
(45) Date of Patent: Sep. 20, 2022

(54) SELF-CLEANING METHOD FOR FOOD PROCESSOR

(71) Applicant: JOYOUNG COMPANY LIMITED, Jinan (CN)

(72) Inventors: Xuning Wang, Jinan (CN); Hongwei Guo, Jinan (CN); Yanhua Wu, Jinan (CN); Qilang Huang, Jinan (CN)

(73) Assignee: JOYOUNG COMPANY LIMITED, Jinan (CN)

( * ) Notice: Subject to any disclaimer, the term of this patent is extended or adjusted under 35 U.S.C. 154(b) by 0 days.

(21) Appl. No.: 17/263,898

(22) PCT Filed: Jul. 29, 2019

(86) PCT No.: PCT/CN2019/098131
§ 371 (c)(1),
(2) Date: Jan. 28, 2021

(87) PCT Pub. No.: WO2020/024894
PCT Pub. Date: Feb. 6, 2020

(65) Prior Publication Data
US 2021/0316342 A1    Oct. 14, 2021

(30) Foreign Application Priority Data

Jul. 30, 2018  (CN) .......................... 201810851762.0
Dec. 14, 2018  (CN) .......................... 201822108403.4
Jun. 4, 2019  (CN) .......................... 201910481587.5

(51) Int. Cl.
*B08B 9/08*  (2006.01)
*A47J 43/046*  (2006.01)
(Continued)

(52) U.S. Cl.
CPC .......... *B08B 9/0813* (2013.01); *A47J 43/046* (2013.01); *A47J 43/0716* (2013.01); *B08B 3/104* (2013.01);
(Continued)

(58) Field of Classification Search
CPC ... B08B 9/0813; B08B 3/104; B08B 2209/08; B08B 2230/01; A47J 43/046; A47J 43/0716
See application file for complete search history.

(56) References Cited

U.S. PATENT DOCUMENTS

2009/0233034 A1   9/2009  Ulanski
2013/0308417 A1  11/2013  Ulanski
(Continued)

FOREIGN PATENT DOCUMENTS

CN    202536009 U    11/2012
CN    102846186 A     1/2013
(Continued)

OTHER PUBLICATIONS

Machine Translation of CN108814342A (Year: 2018).*
Machine Translation of CN207341676U (Year: 2018).*

*Primary Examiner* — Sharidan Carrillo
(74) *Attorney, Agent, or Firm* — Kilpatrick Townsend & Stockton, LLP

(57) ABSTRACT

A self-cleaning food processor includes a body and a crushing assembly. The crushing assembly includes a cup body, a cup lid, a crushing electric motor and a crushing device, wherein the cup lid cooperates with the cup body to form a crushing cavity, an output shaft of the crushing electric motor extends into the crushing cavity, the crushing device is located in the crushing cavity and is connected to the output shaft of the crushing electric motor, and the volume of the crushing cavity is V1. A cleaning process is provided after the food processor completes food processing, and in
(Continued)

the cleaning process, cleaning water, the volume of which is no less than V0, is injected into the cup body at least twice, and the crushing device is controlled to drive the cleaning water to move in the crushing cavity, wherein $0.2V1 \leq V0 \leq 0.6V1$.

7 Claims, 17 Drawing Sheets

(51) Int. Cl.
    *A47J 43/07*     (2006.01)
    *B08B 3/10*     (2006.01)

(52) U.S. Cl.
    CPC ....... *B08B 2209/08* (2013.01); *B08B 2230/01* (2013.01)

(56) References Cited

U.S. PATENT DOCUMENTS

2014/0212566 A1*   7/2014   Herbert .................... A23G 9/04
                                                                                         99/287

2016/0029844 A1*   2/2016   Pineda .................. A47J 43/046
                                                                                         366/147

FOREIGN PATENT DOCUMENTS

| CN | 102920337 A | 2/2013 |
|---|---|---|
| CN | 101952020 B | 11/2014 |
| CN | 204520243 U | 8/2015 |
| CN | 206252402 U | 6/2017 |
| CN | 107184104 A | 9/2017 |
| CN | 105537177 B | 10/2017 |
| CN | 206675490 U | 11/2017 |
| CN | 207341676 U | 5/2018 |
| CN | 108420334 A | 8/2018 |
| CN | 109106237 A | 1/2019 |
| CN | 109106238 A | 1/2019 |
| CN | 209090991 U | 7/2019 |
| CN | 209091022 U | 7/2019 |
| CN | 209091023 U | 7/2019 |
| CN | 110236423 B | 12/2020 |
| KR | 20170058717 A | 5/2017 |

* cited by examiner

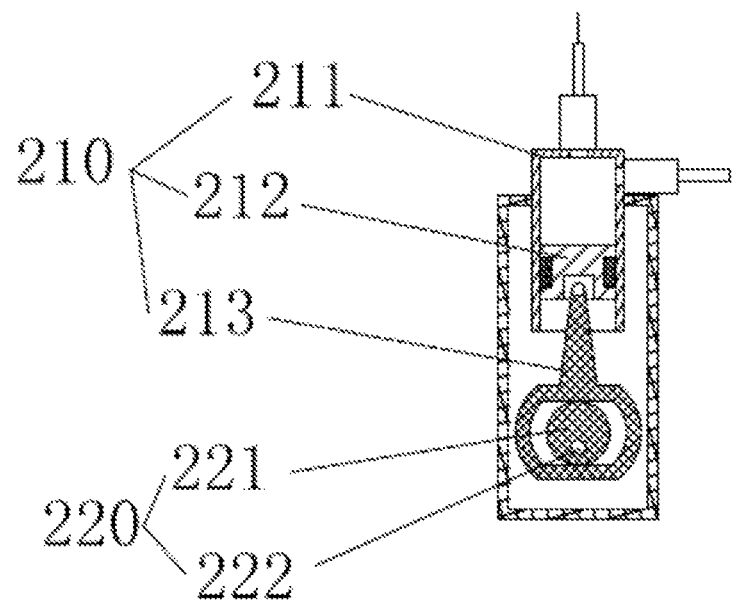
Figure 16
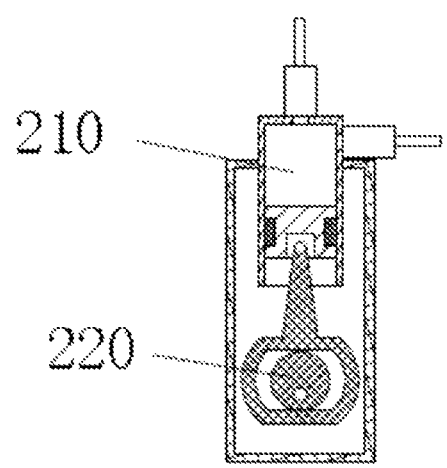 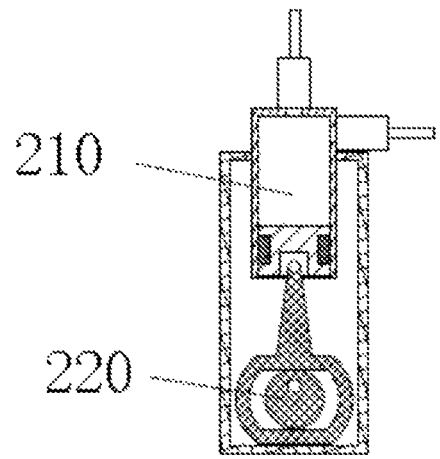
Figure 17    Figure 18

SELF-CLEANING METHOD FOR FOOD PROCESSOR

This application is the national phase of International Application No. PCT/CN2019/098131, titled "SELF-CLEANING FOOD PROCESSOR", filed on Jul. 29, 2019, which claims the benefit of priorities to the following Chinese patent applications:

Chinese Patent Application No. 201810851762.0, titled "SELF-CIRCULATION CLEANING FOOD PROCESSOR", filed with the China National Intellectual Property Administration on Jul. 30, 2018;

Chinese Patent Application No. 201822108403.4, titled "SELF-CLEANING FOOD PROCESSOR", filed with the China National Intellectual Property Administration on Dec. 14, 2018;

Chinese Patent Application No. 201910481587.5, titled "SELF-CLEANING METHOD FOR FOOD PROCESSOR", filed with the China National Intellectual Property Administration on Jun. 4, 2019;

the entire disclosures thereof are incorporated herein by reference.

FIELD

The present application relates to small kitchen appliances, and in particular to a self-cleaning food processor.

BACKGROUND

The conventional soybean milk machine includes a machine head and a cup body. When making the soybean milk, the materials are confined in the cup body to be crushed, so as to obtain the soybean milk. However, for this type of soybean milk machine, after the soybean milk making process is completed, the user needs to clean the cup body by himself, and since the bottom of the cup body is equipped with electrical components for heating, the cup body cannot be immersed in water for cleaning. The reason why this type of soybean milk machine cannot perform automatic cleaning is that, due to a great depth of the cup body, the cleaning water cannot wash the whole cup wall of the soybean milk machine during cleaning, and the operation is complicated.

In addition, there is another type of soybean milk machine, in which the cup body is fixed in the base and cannot be detached. After the soybean milk making process is completed, because the cup body is non-detachable, the inner surface of the cup body may be covered with a layer of residual stains every time a drink is made which may not be cleaned. After a long time, bacteria are easily bred, resulting in food safety risks.

In view of this, a goal of soybean milk machine manufacturers and research personnel is to realize the self-cleaning of soybean milk machine.

SUMMARY

An object of the present application is to provide a self-cleaning food processor with high crushing efficiency and good cleaning effect.

To achieve the above object, the following technical solutions are provided according to the present application. A self-cleaning food processor includes a machine body and a crushing assembly arranged on the machine body. The crushing assembly includes a cup body, a cup lid, a crushing motor and a crushing device, wherein the cup lid cooperates with the cup body to define a crushing cavity, an output shaft of the crushing motor extends into the crushing cavity, and the crushing device is located in the crushing cavity and is connected to the output shaft of the crushing motor. A volume of the crushing cavity is V1, the food processor is configured to perform a cleaning process when food processing is completed, and in the cleaning process, cleaning water having a volume of no less than V0 is injected into the cup body at least twice, and the crushing device is controlled to drive the cleaning water to move in the crushing cavity, and wherein $0.2V1 \leq V0 \leq 0.6V1$.

Further, the cleaning process includes a steaming stage, in which steam is used to steam an inner wall of the crushing cavity to soften residues.

Further, the self-cleaning food processor further includes a steam generator, and the steam generator is configured to introduce the steam into the crushing cavity in the steaming stage; or, the cup body is provided with a heating device, and in the steaming stage, the heating device heats the cleaning water in the cup body until boiling to generate the steam, for steaming the residues remaining on the inner wall of the crushing cavity.

Further, before the steaming stage, there is also an infiltration stage in which the cleaning water is injected into the cup body, and the crushing cutter drives the cleaning water to scour the inner wall of the crushing cavity.

Further, the infiltration stage includes a process of heating the cleaning water in the cup body to a temperature T, and the temperature T is less than a boiling temperature of the cleaning water.

Further, the infiltration stage includes a process in which the cleaning water is injected into the cup body and the crushing cutter is configured to drive the cleaning water to scour the inner wall of the crushing cavity for many times; and the cleaning water out of the cup body is discharged after each time of scouring is completed.

Further, a cleaning process, in which the crushing device is configured to drive the cleaning water to clean the crushing cavity and the cleaning water is discharged out of the cup body for at least two times, is provided, wherein the at least two times of cleaning processes form a diffusion cleaning stage and a converging cleaning stage.

Further, water consumption in the diffusion cleaning stage is V0, water consumption in the converging cleaning stage is V1, and $V1 \geq V0$.

Further, a water outlet is provided in the crushing cavity, and the water outlet faces the inner surface of the crushing cavity, to spray water to wash and clean the cavity wall of the crushing cavity.

Further, the food processor further includes a pressure device, the pressure device is in communication with the water outlet through a first pipeline, and is configured to intermittently spray water under pressure from the water outlet to the inner surface of the crushing cavity.

Further, a drainage port is provided in the crushing cavity, the drainage port is in communication with the water outlet through a communication valve, and the crushing device drives the cleaning water to flow from the drainage port to the water outlet to be sprayed to the inner surface of the crushing cavity.

Further, an inner side of a side wall of the cup body is provided with a nozzle, and the water outlet is arranged at the nozzle; or, the cup lid is provided with a spray device, the spray device extends into the crushing cavity, and the water outlet is arranged at the spray device; or, a transition piece is provided between the cup body and the cup lid, the transition piece is located above the cup body and is in sealing engagement with an upper end of the cup body, and a nozzle having the water outlet is arranged at the transition piece.

Further, the water outlet at least partially faces the cup lid.

Further, the cup lid includes a top wall and a side wall located at a periphery of the top wall, wherein the top wall is flat or arc-shaped, and the side wall is inclined from bottom to top toward a center, and a transition crease is formed between the top wall and the side wall.

Further, a horizontally projected area of the top wall is S1, a horizontally projected area of a region defined by an outer edge of the side wall is S2, and 0.6≤S1/S2≤0.9; or, an included angle between the top wall and the side wall at the transition crease ranges from 100° to 135°; or a height difference between a water outlet and a highest point inside the cup lid ranges from 3-30 mm.

Further, the side wall of the cup body is provided with a spoiler rib, the spoiler rib extends downward to a bottom of the cup body, and an included angle between the side wall of the cup body and the bottom of the cup body is greater than 90°; the spoiler rib includes a spoiler surface and a back side surface, and a plane from a junction between the spoiler surface and the back side surface to a center of the cup body is taken as a vertical plane, and an included angle between the spoiler surface and the vertical plane is α, and wherein 110<α<160.

Further, a height of the spoiler rib is S, a height of the cup body is L, and wherein S:L≤9:10.

Further, the crushing device is a crushing cutter, and a distance between a highest point of the crushing cutter and a bottom of the cup body is h1, and a height of a liquid level in the cup body during cleaning is a, and wherein h1≤a≤3h1.

Further, a diameter of a cup mouth of the cup body is m, and a diameter of a lid mouth of the cup lid matched with the cup body is n, and wherein 0.8≤m:n≤1.2.

Further, a side wall of the cup body is provided with a spoiler rib, a distance between a bottom of the spoiler rib and a bottom of the cup body is h3, the crushing device is a crushing cutter, and a distance between a highest point of the crushing cutter and the bottom of the cup body is h1, and wherein h1≥h3.

In the process of processing food by the food processor, food residues are not only left on the cup body, but also appear on the cup lid because the food may come into contact with the cup lid when the crushing device processes the food. Hence, the cup body and the cup lid may be effectively cleaned by washing with water for many times and with a certain amount of cleaning water. Otherwise, if the amount of water is too small, the cup lid may not be cleaned, or if the amount of water is too much, an effective scouring effect may not be provided, and cleaning water resources are wasted.

In the cleaning process, an infiltration stage, a steaming stage and a cleaning stage are provided to clean different types of residues. In the infiltration stage, the crushing cutter is used to remove large residues first, and the cleaning water is brought into contact with the residues to moisten the residues and achieve the effect of soaking, so that the residues with high adhesion is softened. In the following process, the residues are steamed, which means entering the steaming stage. In the steaming stage, steam is used to further soften the residues on the wall of the crushing cavity, especially in the case that the infiltration is performed in the previous stage, it is ensured that the stubborn residues can be separated from the wall of the crushing cavity. Finally, cleaning is carried out, and thus the overall cleaning may achieve a better effect.

Different amounts of water are used to form a diffusion cleaning stage and a converging cleaning stage, so as to clean different types of residues. By controlling the amount of water in the two stages, different cleaning requirements can be satisfied due to different loads in the process that the crushing cutter drives the cleaning water. In the diffusion cleaning stage, less water is used, so that the cleaning water may achieve a better diffusion effect under the drive of the crushing cutter. In this way, due to the small load, the crushing cutter may diffuse the water to a higher position, to better soak the entire crushing cavity, besides, in the cleaning process, due to the small load, the impact force formed by the cleaning water driven by the crushing cutter is also great, which may generate a spray effect and achieve the effect of washing under pressure, so that the residues with high viscosity may be better cleaned. In the converging cleaning stage, since the amount of water is larger than that in the diffusion cleaning stage, a converged water flow is mainly formed during the rotation of the crushing cutter, which can wash the soaked residues, and the residues are completely separated from the cup body and the cup lid along with the water flow, thus achieving a better cleaning effect.

The residues may be effectively cleaned by spraying the wall of the crushing cavity through the water outlet. The pressure device pumps water intermittently, and the water is sprayed intermittently from the water outlet to the inner surface of the crushing cavity. The impact force of spraying is great, and the substances attached to the inner surface of the crushing cavity are more easily to be washed off by impact, and flows along with the water flowing down from the inner surface of the crushing cavity to be accumulated at the bottom of the crushing cavity, so that the cleaning effect of the inner surface of the crushing cavity is better and the crushing cavity is easier to clean. In addition to providing the pressure device, the circulation manner may also be set to spray the cleaning water from the water outlet by driving of the crushing device.

The side wall of the cup body is provided with the spoiler rib, and the spoiler rib extends downward to the bottom of the cup body. Compared with the prior art, since the spoiler rib extends to the bottom of the cup body, in the cleaning process of the food processor, when the crushing cutter rotates at a high speed, the cleaning liquid in the cup body is driven to rotate centrifugally at a high speed, and the cleaning liquid moves along the side wall of the cup body and comes into contact with the spoiler rib on the side wall of the cup. At this time, the flow direction and flow rate of the cleaning liquid are changed, part of the liquid flow moves along an obstructing oblique surface of the spoiler rib, and the cleaning liquid may climb to the cup mouth of the cup body along the oblique surface of the spoiler rib, forming a V-shaped liquid surface region. When the cleaning liquid sweeps across the cup wall of the cup body, it may wash away the slurry stains and residues on the cup wall. Since the spoiler rib of cup body extends to the bottom of the cup body, more cleaning liquid may climb to the cup mouth of the cup body due to the obstruction of the bottom of the cup body, to rush to the cup lid and clean the cup lid. Besides, as the rotating speed of the crushing cutter is being gradually decreased, the cleaning liquid flows back down along the cup wall of the cup body under the action of gravity, thus forming secondary washing of the cup wall. Moreover, after repeated rotation and stopping of the crushing cutter, cyclic cleaning of the whole crushing region is achieved by the cleaning liquid.

In addition, part of the liquid rushes to the central region, since the spoiler rib at the side wall of the cup body extends to the bottom of the cup body, the flow rate of this part of the cleaning liquid becomes greater. In addition, when the crushing cutter rotates at a high speed, the central region of the crushing cutter is in a vacuum state, at this time, the motor shaft and part of the crushing cutter in the vacuum region may not be washed by the water flow, while bean dregs are more likely to be bonded in this region due to high temperature during pulping, therefore, by extending the spoiler rib on the side wall of the cup body to the bottom of the cup body, the motor shaft and the crushing cutter in the vacuum region can be effectively cleaned.

If the spoiler rib does not extend to the bottom of the cup body, the liquid flow below the spoiler rib may move circumferentially, and the scouring effect of the liquid flow on the motor shaft and the crushing cutter is poor. In this case, it is necessary to define a relationship between the spoiler rib and the crushing cutter, so as to ensure a certain crushing effect.

BRIEF DESCRIPTION OF THE DRAWINGS

The present application will be further described hereinafter in conjunction with the drawings.

FIG. 16 is a schematic view showing the structure of a pressure device of a self-cleaning food processor according to an embodiment of the present application;

FIG. 17 is a schematic view showing the structure of the pressure device in FIG. 16 when the pressure device pumps water;

FIG. 18 is a schematic view showing the structure of the pressure device in FIG. 16 when the pressure device draws water;

DETAILED DESCRIPTION OF THE EMBODIMENTS

Embodiments

Figure 1:
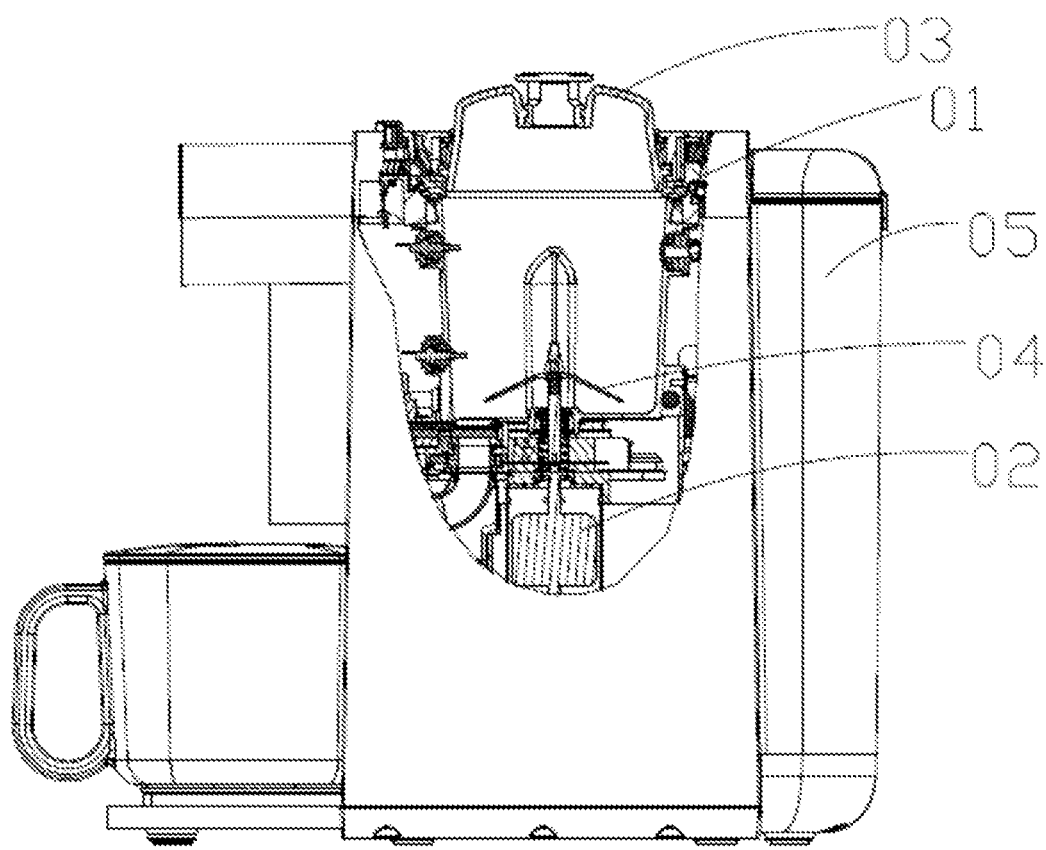
FIG. 1 is a schematic view showing the structure of a whole self-cleaning food processor according to an embodiment of the present application.

As shown in FIG. 1, it is a schematic view showing the structure of a food processor according to the present application. The food processor includes a cup body 01 configured for food processing, a crushing motor 02 is arranged at a bottom of the cup body, and a motor shaft of the crushing motor 02 passes through the bottom of the cup body 01 to be connected with a crushing cutter 04 arranged inside the cup body 01. A cup lid 03 is arranged on the cup body 01, and an upward concave auxiliary cavity is formed at a bottom of the cup lid 03, and a crushing cavity configured for crushing materials is defined by the auxiliary cavity and the cup body. When the food processor is in operation, the materials in the cup body rushes up along a cavity wall of the cup body to enter the auxiliary cavity. The food processor is further provided with a water tank 05, which supplies water into the cup body 01 for crushing materials to form slurry, and may also supply water for cleaning the crushing cavity.

In this embodiment, a volume of the crushing cavity is V1. A cleaning process is provided after the food processor completes food processing, and in the cleaning process, cleaning water having a volume no less than V0 is injected into the cup body at least twice, and the crushing device is controlled to drive the cleaning water to move in the crushing cavity, wherein $0.2V1 \leq V0 \leq 0.6V1$.

The cup body and the cup lid can be effectively cleaned by washing for multiple times with a certain amount of cleaning water. Otherwise, if the amount of water is too small, the cup lid may not be cleaned, or if the amount of water is too much, an effective scouring effect may not be formed, which wastes cleaning water resources.

In this embodiment, in addition to the cleaning process in which the cleaning water is driven by the crushing device, the specific cleaning process may further include an infiltration stage and a steaming stage. In the infiltration stage, the cleaning water is injected into the cup body, and the crushing cutter drives the cleaning water to wash an inner wall of the crushing cavity. In the steaming stage, steam is used for steaming the inner wall of the crushing cavity to soften residues.

In the entire cleaning process, the infiltration stage and the steaming stage are provided to clean different types of residues. In the infiltration stage, the crushing cutter is used to remove large residues first, and the cleaning water is brought into contact with the residues to moisten the residues and achieve the effect of soaking, so that the residues with high adhesion is softened. In the following process, the residues are steamed, which means entering the steaming stage. In the steaming stage, steam is used to further soften the residues on the wall of the crushing cavity, especially in the case that the infiltration is performed in the previous stage, it can be ensured that the stubborn residues can be separated from the wall of the crushing cavity. Finally, cleaning is carried out, and thus the overall cleaning may achieve a better effect.

Of course, further, the infiltration stage includes heating the cleaning water in the cup body to a temperature T, and the temperature T is less than a boiling temperature of the cleaning water.

In the infiltration stage, the infiltration effect may be better achieved by using hot water, which is beneficial to the softening of the residues. The temperature of hot water has a certain softening effect and is beneficial to removal of residues with oil stains. In addition, the temperature in the infiltration stage is lower than the boiling temperature. First of all, a too high temperature may not bring a better effect on infiltration, instead, it makes the cleaning water apt to be vaporized. Although steaming may be performed by vaporization, the steaming effect may not be maximized in a case that the steaming starts without infiltration. That is to say, if the vaporization is carried out at this stage, the cleaning water may become less and the infiltration may not be better performed, and the steaming effect may not be achieved, which affects the subsequent cleaning effect. Moreover, the cleaning water is heated to the boiling temperature, which wastes electrical energy, and thus increasing the power consumption cost of the food processor. In addition, in the infiltration stage and the steaming stage, the cleaning water in the cup body is discharged at an end of each of the stages, which is beneficial to the discharge of the whole residues and avoids secondary leftover of large residues in the subsequent cleaning process. Besides, each of the stages is provided for different types of residues, by discharging the corresponding residues in time, the overall cleaning effect can be optimized.

Of course, in the whole cleaning process, the infiltration stage may not refer to a basic unit, or a one-time water injection and cleaning process. The whole cleaning process may include multiple times of soaking. That is, the whole infiltration stage may be an infiltration stage formed by one-time water injection, cleaning and discharging, or may be a process in which the above infiltration stage is circularly repeated. In this case, in order to better ensure the effect of the steaming cleaning stage, when multiple infiltration stages are provided, the cleaning water is discharged out of the cup body after each time of water injection and cleaning. Similarly, the whole cleaning process may also include multiple steaming stages and cleaning stages. Starting with the infiltration stage, and the whole cleaning process is completed by alternately performing the infiltration stage, steaming stage and cleaning stage.

Figure 2:
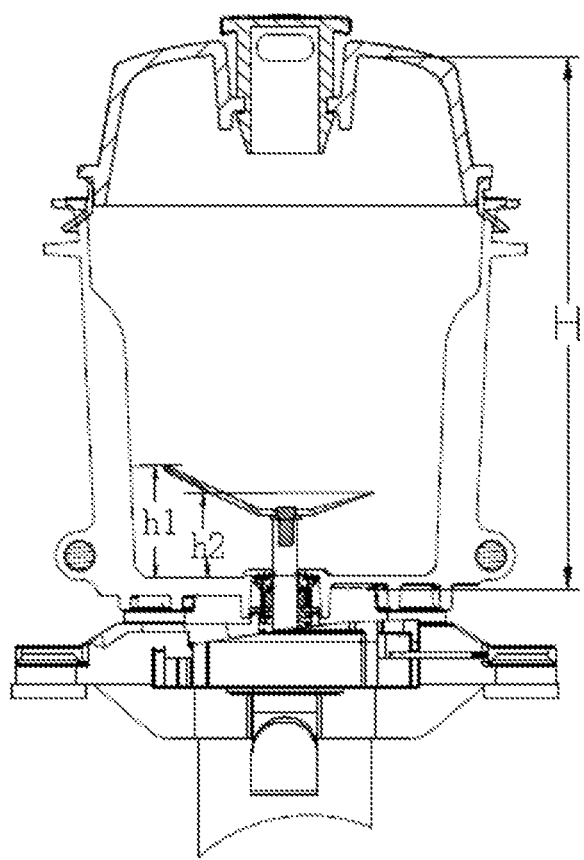
FIG. 2 is a schematic view showing the structure of a crushing cavity of the self-cleaning food processor according to the embodiment of the present application.

Optionally, in the steaming stage, the cleaning water in the cup body may be heated to generate steam, that is, the cup body is provided with a heating device. In the steaming stage, the cleaning water in the cup body is heated, by the heating device, to be boiled to generate steam, for steaming the residues left inside the crushing cavity. As shown in FIG. 2, in this case, a vertical height of the crushing cavity is H, and in the steaming stage, a height of the cleaning water in the cup body is h0, wherein h0≤0.3H, which ensures that enough steam can be provided for steaming the whole crushing cavity, and avoids that the steam may not reach the cup lid because the crushing cavity is too high. Besides, it also ensures that a better steaming effect may be achieved with a small amount of water, which reduces the requirement for heating energy.

Of course, the food processor may also be provided with a steam generator, and in the steaming stage, the steam generator is used to generate steam, so as the entire crushing cavity can be steamed.

In addition, in order to further improve the cleaning effect, the crushing cavity may be pre-steamed before the infiltration stage, which can improve the effect of the infiltration stage. The so-called pre-steaming refers to initial pre-heating by generating a small amount of steam, or to maintain the entire crushing cavity in a higher temperature environment.

From another point of view, in this embodiment, when cleaning water is fed and the crushing device is driven to clean for at least two times, the amount of water inflow of the two times may be differentiated, thus forming a diffusion cleaning stage and a converging cleaning stage, wherein the water consumption of the diffusion cleaning stage is V0, and the water consumption of the converging cleaning stage is V1, V1≥V0.

That is, the infiltration stage may function as a diffusion cleaning stage, while the cleaning stage after the steaming stage may function as a converging cleaning stage. The amount of the water required in the infiltration stage is relatively small, which leads to a better diffusion effect and water impacting effect in the process that the water is driven by the crushing cutter. In this way, the cleaning water may reach a greater height and generate a greater impact force, which facilitates washing the residues by the cleaning water, and makes more positions of the whole crushing cavity to be soaked by the cleaning water, which is beneficial to optimizing the cleaning effect.

Of course, the subsequent cleaning stage may also be divided into the diffusion cleaning stage and the converging cleaning stage. Of course, the water consumption relationship between the diffusion cleaning stage and the converging cleaning stage is that the water consumption in the converging cleaning stage is greater than that in the diffusion cleaning stage, this kind of cleaning with large and small amount of water leads to better cleaning effect due to changes.

The diffusion cleaning stage and the converging cleaning stage are provided to clean different types of residues. By controlling the amount of water in the two stages, different cleaning requirements can be satisfied due to different loads in the process that the crushing cutter drives the cleaning water. In the diffusion cleaning stage, less water is used, so that the cleaning water may achieve a better diffusion effect under the drive of the crushing cutter. In this way, due to the small load, the crushing cutter may diffuse the water to a higher position, to better soak the entire crushing cavity, besides, in the cleaning process, due to the small load, the impact force formed by the cleaning water driven by the crushing cutter is also great, which may generate a spray effect and achieve the effect of washing under pressure, so that the residues with high viscosity may be better cleaned. In the converging cleaning stage, since the amount of water is larger than that in the diffusion cleaning stage, a converged water flow is mainly formed during the rotation of the crushing cutter, which can wash the soaked residues, and the residues are completely separated from the cup body and the cup lid along with the water flow, thus achieving a better cleaning effect.

As shown in FIG. 2, in this embodiment, the crushing cutter includes multiple blades, and the multiple blades of the crushing cutter are not arranged on a same plane. A height of a blade tip which is at a maximum distance from the bottom of the cup body is h1, and a height of another blade tip which is at a minimum distance from the bottom of the cup body is h2. In the diffusion cleaning stage, a water level in the cup body is h01, wherein h1≥h01>h2; in the converging cleaning stage, a water level in the cup body is h02, wherein h02≥h1.

By arranging the multiple blades of the crushing cutter on different planes, and in the diffusion cleaning stage, the water level of the cleaning water is limited between the high and low blades, in this way, the crushing cutter forms a water pushing portion and a diffusion portion, and the blade arranged at a lower position forms the water pushing portion, which pushes the cleaning water upward first, and then the blade at a higher position relays to diffuse the cleaning water, which improves the diffusion degree of the cleaning water and increases a linear velocity of the corresponding cleaning water flow. In addition, the cleaning water may form more single drops, and thus achieving a better spray cleaning effect. The converging cleaning stage is mainly for forming converged water flow to wash the residues, so the water level is above the blade at the higher position, which reduces the diffusion effect to form a better water flow pattern, which is convenient for cleaning the residues, besides, through the relay of the blade at the higher position, the water flow can impact the cup lid, thus meeting higher cleaning requirements.

Specifically, in this embodiment, in order to better ensure that the crushing cutter can better diffuse the cleaning water in the diffusion cleaning stage, h01≥(h1−h2)/3+h2. That is, one third of a portion between the highest blade and the lowest blade must be filled with the cleaning water, so that the cleaning water can be better diffused. If the water level is low, the blade at the lower position is not able to better agitate the cleaning water, and the blade at the higher position cannot diffuse the cleaning water, in this way, the cleaning water may easily form a V-shaped vortex at the lower position, which is not conducive to the action of the blade at the higher position on the cleaning water.

Specifically, in this embodiment, in order to better ensure that the formed water flow may reach a better position in the converging cleaning stage, h02≤2h1. Because in the converging cleaning stage, the cleaning water is mainly driven by the rotation of the crushing cutter to form the corresponding water flow, thus taking away the residues on the wall of the crushing cavity. In this process, the cleaning water may form a V-shaped vortex in the cup body with the rotation of the crushing cutter, and a height that the vortex is able to reach is determined by the crushing cutter, that is, a critical position of a height which the cleaning water can be driven by the height cutter to reach is a critical position where the crushing cutter can still be in contact with the cleaning water. After the V-shaped vortex is formed, the water level around the cup body rises, while the crushing cutter is in a central position, which lowers the water level. If the cleaning water level is relatively low, the height of the formed water flow may not be sufficient for cleaning the whole crushing cavity in the cleaning process.

Of course, in the whole cleaning process, the diffusion cleaning stage does not refer to one cleaning unit or one water injection and cleaning process. In the whole cleaning process, multiple times of diffusion cleaning may be included. That is, the overall diffusion cleaning stage may be a diffusion cleaning stage formed by one-time water injection, cleaning and discharge, or may be a process in which the above diffusion cleaning stage is repeated for multiple times. In this case, in order to better ensure the effect of the diffusion cleaning stage, for multiple times of diffusion cleaning, the cleaning water is discharged out of the cup body after each time of water injection and cleaning. Similarly, the whole cleaning process may also include multiple converging cleaning stages. Of course, the diffusion cleaning stage may be completed before entering the converging cleaning stage; or the diffusion cleaning stage may be followed by the converging cleaning stage and then another diffusion cleaning stage, etc., that is, starting with the diffusion cleaning stage, and then completing the entire cleaning by alternately performing the converging cleaning stage and the diffusion cleaning stage.

In this embodiment, in the diffusion cleaning stage, the water injection and cleaning process include a step of heating the water injected into the cup body. Using hot water for cleaning may effectively soften the residues attached to the crushing cavity wall, which is beneficial for better cleaning in the subsequent cleaning process. Because in the food processing process, when the food residues adhere to the crushing cavity wall, they may condense on the crushing cavity wall due to time, which may increase the adhesion of the residues on the crushing cavity wall. However, a greater impact force may not be formed through diffusion, which makes it difficult to remove the residues. Thus, the softening function of hot water is required to soften the residues. Therefore, in the diffusion cleaning process, before the crushing cutter works, the cleaning water may be heated first, so that the hot water can be used for cleaning to achieve a better cleaning effect.

In this embodiment, in the diffusion cleaning stage, a rotating speed of the crushing motor rises to N1 within a time interval t1, where t1≤5 seconds and N1≥3000 revolutions. This is conducive to the rapid increase of the motor speed, to form greater impact, which is conducive to the formation of diffusion.

This embodiment is described above mainly from the aspect of improving the cleaning effect by controlling the cleaning process. In this embodiment, the manner of introducing the water into the cup body may also be improved. With arrangement of a water outlet, the cleaning water entering the cup body may start to clean the crushing cavity as it is entering the crushing cavity. In other words, the water outlet faces an inner surface of the crushing cavity, so as to scour and clean the cavity wall of the crushing cavity by spraying the water.

In this embodiment, a nozzle may be arranged at an inner side of a side wall of the cup body, and the water outlet is provided at the nozzle; or, a spray device is arranged at the cup lid and extends into the crushing cavity, and the water outlet is provided at the spray device; or, a transition piece is arranged between the cup body and the cup lid, the transition piece is positioned above the cup body and is in sealing engagement with an upper end of the cup body, and a nozzle having the water outlet is arranged at the transition piece; or, the motor shaft of the crushing motor is hollow and an end of the motor shaft is provided with a water outlet hole.

It has been mentioned above that the food residues may remain on the cup lid during the food processing process of the food processor, and when the cleaning water is driven by the crushing device for cleaning, it is difficult to fully clean the cup lid, or it requires a large amount of energy. Therefore, the water outlet may be arranged toward the cup lid, so that the cup lid can be better scoured by spraying.

Figure 3:
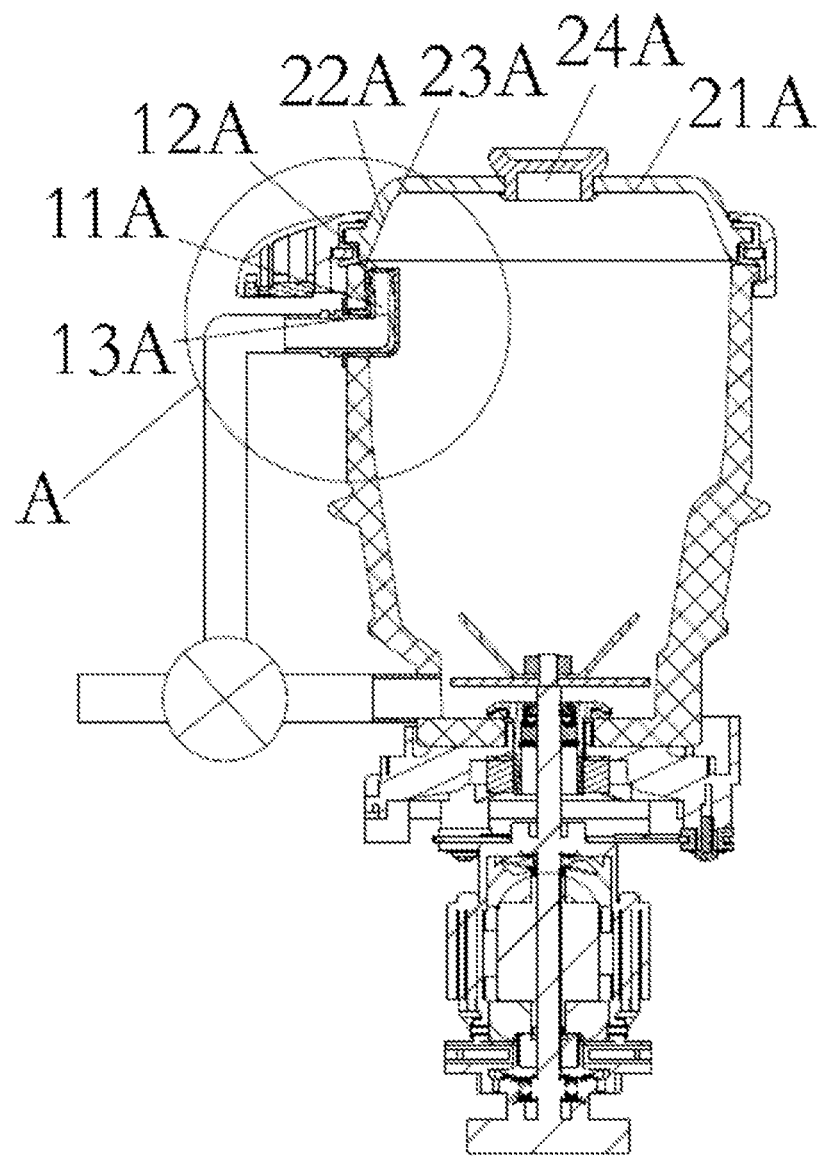
FIG. 3 is a schematic view showing the structure of a water outlet of a cup body of the self-cleaning food processor according to the embodiment of the present application.
Figure 4:
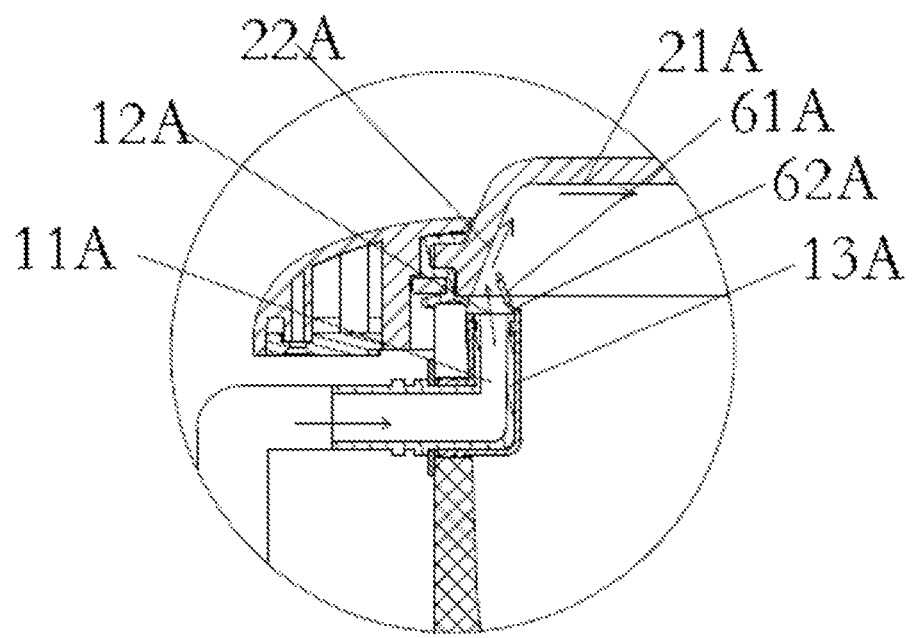
FIG. 4 is a partially enlarged view of a portion A in FIG. 3.

For more direct illustration with examples, a solution that the water outlet faces the cup lid is directly taken as an example in this embodiment. Specifically, in this embodiment, as shown in FIGS. 3 and 4, a nozzle 11A configured for spraying water toward the cup lid is arranged at the inner side of the side wall of the cup body, and the nozzle 11A includes a water outlet 12A which is located below a rim of the cup body. Wherein, a spray direction of the nozzle may be vertical or tilt upward. Generally, in the food processor, the cup lid, a sealing portion between the cup lid and the cup body and the like are all blind sides of cleaning where dregs are easily accumulated and a liquid detergent cannot easily reach. The water outlet 12A is located below the rim of the cup body, which allows the water flow to directly impact the sealing portion between the cup lid and the cup body, thus ensuring the cleaning effect of this position; on the other hand, if the water outlet protrudes out of the rim, the overall aesthetics may be affected, besides, it is not conducive to manual scrubbing because hands may be easily scratched. In this embodiment, a vertical height difference between the water outlet 12A and the rim of the cup body is 1.2 mm, and preferably, this parameter may be 1 mm to 10 mm. If the vertical height difference between the water outlet and the rim of the cup body is less than 1 mm, it may interfere with the sealing portion between the cup body and the cup lid; and if the height difference is greater than 10 mm, the impact strength of the water flow may be affected due to the relatively great height difference, resulting in poor cleaning effect of the water outlet and the sealing portion of the cup body.

In this embodiment, an inner wall of the cup lid converges from bottom to top toward the center. Specifically, an area of a region formed by sectioning the inner wall of the cup lid cut by a horizontal plane becomes smaller along the direction from bottom to top. Since the nozzle 11A directly impacts an edge region of the inner wall of the cup lid, the water flow continues to flow upwards under an action of inertia, and the inner wall of the cup lid converges from bottom to top toward the center, which facilitates continuous changes of the direction of the water flow due to the restriction of the inner wall when it flows upwards, thus ensuring the scouring effect of the water flow. On the other hand, the inner wall of the cup lid with the above structure also facilitates guiding the water flow to spread to cover the inner wall of the cup lid, thus avoiding blind sides of cleaning.

Preferably, the cup lid includes a top wall 21A and a side wall 22A located at a periphery of the top wall 21A. The top wall 21A is flat. The side wall 22A is inclined toward the center from bottom to top. A transition crease 23A is formed between the top wall 21A and the side wall 22A. In the scouring process, the water flow is sprayed from the water outlet 12A, first impacts a side wall of the cup body below the rim of the cup body or an inner wall of the side wall 22A of the cup lid, and flows upward along the above portions, accompanied by a certain degree of water flow dispersion effect, which is a first dispersion stage. What is important is that when the water flow passes through the transition crease 23A with sharp change in curvature, relatively severe water flow dispersion effect may occur, and the water flow may disperse quickly at the top wall 21A, which is a second dispersion stage. Thus, the water flow can better cover the inner wall of the top wall 21A, and better cover the side wall of the cup body as it t flow downward along another side of the inner wall of the cup lid. Of course, the top wall may also be an upwardly arched curved surface. As another embodiment of the cup lid, the inner wall of the cup lid may also be an upwardly arched curved surface as a whole, which means, the above structure of the transition crease is not provided, and distinguishing between the side wall and the top wall of the inner wall of the cup lid is pointless. In addition, a central region of the cup lid may also be provided with a through hole, and a through hole plug 24A is provided at the through hole, which is configured to be opened to facilitate placing materials in the container.

In this embodiment, a horizontally projected area of the top wall 21A is S1, and a horizontally projected area of a region defined by an outer edge of the side wall 22A is S2, $0.6 \leq S1/S2 \leq 0.9$. The above parameters are selected with consideration of technical effects. Specifically, in a case that $S1/S2<0.6$, a region corresponding to the top wall is relatively small, which is not conducive to the full dispersion of the water flow in the second dispersion stage, and blind sides of cleaning may easily be formed near a region where the side wall of the cup body forms an angle of 90° with respect to the water outlet in a circumferential direction. On the other hand, for the cup lid of this form, an inclination angle of the side wall of the cup lid with respect to a vertical direction may be large, which is not beneficial for guiding the water flow, and may cause the water flow to rebound off the inner wall when impacting the side wall; or, a height of the side wall extending in an axial direction may be large, in this case, the scouring force of the water flow may be insufficient when it reaches the top wall, which may affect the cleaning effect of the top wall. In a case that $S1/S2>0.9$, for the cup lid of this form, the inclination angle of the side wall with respect to the vertical direction is small, on one hand, the water flow may not be dispersed well in the first dispersion stage, thus the water flow impacting the transition crease region is relatively concentrated, on the other hand, the water flow may rebound when passing through the transition crease region due to an overlarge change of angle, which reduces the size of the region that can be covered by the water flow; or, the height of the side wall extending in an axial direction may be small, in this case, the water flow, which is not dispersed well in the first dispersion stage due to insufficient time for dispersion, impacts the transition crease in a relatively concentrated manner, which may affect the dispersion effect in the second dispersion stage. It should be noted that the circumferential direction in this application refers to the direction around a central axis of the container.

An included angle at the transition crease 23A between the top wall 21A and the side wall 22A ranges from 100° to 135°, where the included angle refers to that in a vertical plane passing through the central axis of the cup body, the included angle between a tangent line from the top wall 21A to the transition crease 23A and a tangent line from the side wall 22A to the transition crease 23A. The included angle is embodied as a change in the flow direction of the water flow when it enters the second dispersion stage. If the included angle is smaller than 100°, in a case that it is close to a right angle, it is equivalent that the water flow directly impacts on the flat surface, and there is a risk of rebound of the water flow; and if the included angle is greater than 135°, the dispersion effect of the second dispersion stage may be affected due to excessive flatness.

A height difference between the water outlet 12A and a highest position of the inner wall of the cup body ranges from 3 to 30 mm. In a case that the top wall of the cup lid is flat, the height difference is a height difference between the water outlet and the top wall of the cup lid; in a case that the top wall of the cup lid is arc-shaped, the height difference is a distance from the water outlet to a highest position of the top wall of the cup lid; n a case that the whole cup lid is arc-shaped, the height difference is a distance from the water outlet to a highest position of the inner wall of the cup lid. If the height difference is less than 3 mm, it is not conducive to the dispersion of the water flow; and if the height difference is greater than 30 mm, there is a problem of insufficient scouring force applied to the highest position of the inner wall.

In this embodiment, the nozzle 11A includes a guide section 13A located below the water outlet 12A, and the guide section 13A extends in the axial direction to guide the water flow to spray toward the cup lid. Wherein, the guide section 13A is part of the nozzle 11A, and the nozzle 11A is an individual piece separated from the cup body. Of course, the guide section and nozzle may also be formed in other ways. For example, a surrounding rib is integrally formed on the side wall of the cup body, a lower portion of the surrounding rib is connected to the side wall in a sealing manner, an upper portion of the surrounding rib has an opening which forms the water outlet, and the surrounding rib and a corresponding portion of the side wall of the container together form the nozzle.

Preferably, a radial width L1 of the water outlet 12A is smaller than a circumferential width L2 thereof, that is, the water flow ejected from the water outlet 12 is in a flat shape, and since the water flow is circumferentially dispersed on the inner wall of the cup lid, the water flow of this shape is beneficial to the dispersion process, so that the water flow covers the inner wall of the cup lid more comprehensively.

A nozzle cover 61A configured to cover the water outlet 12A is provided at the water outlet 12A of the nozzle 11A, The nozzle cover 61A can be opened under the action of water flow, and can be reset under the action of its own restoring force, thus preventing the materials or slurry from entering the nozzle 11A through the water outlet 12A to pollute the pipeline during the process of crushing the materials. In this embodiment, the nozzle cover 61A has a rotating shaft 62A, and the nozzle cover 61A rotates around the rotating shaft 62A to open and close the water outlet 12A. The rotating shaft 62A is located at a side of the nozzle cover which is close to the center of the cup body. The nozzle cover 61A is opened under the action of the water flow, and has a tendency to close the water outlet 12A under the action of its own restoring force, thereby forcing and guiding the water flow to spray toward the side wall 22A of the cup lid. Of course, the rotating shaft of the nozzle cover may also be arranged at other positions, a spray angle of the water flow may be different, and the same cleaning effect may be achieved by increasing the flow speed or increasing the flow rate. In addition to the above-mentioned opening and closing manner of rotating around the rotating shaft, the nozzle cover may also have other opening and closing manners. For example, the nozzle cover may move up and down as a whole to open and close the water outlet, which is fixedly connected through at least two springs.

Figure 5:
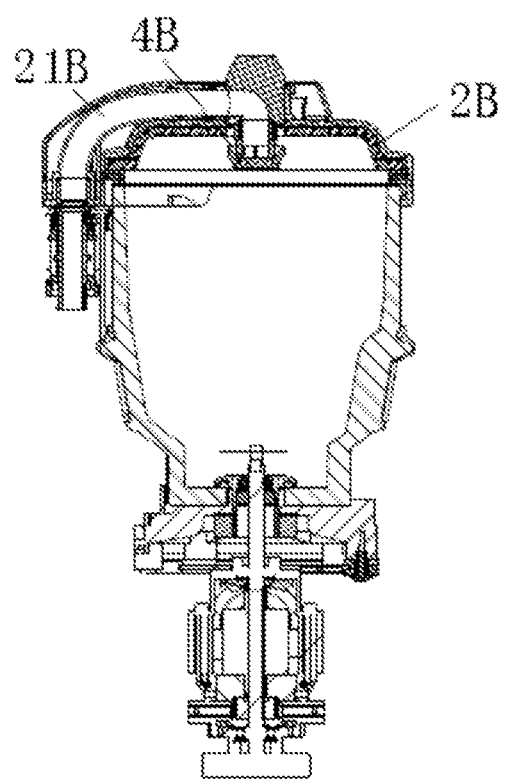
FIG. 5 is a schematic view showing the structure of a water outlet of a cup lid of the self-cleaning food processor according to the embodiment of the present application.
Figure 6:
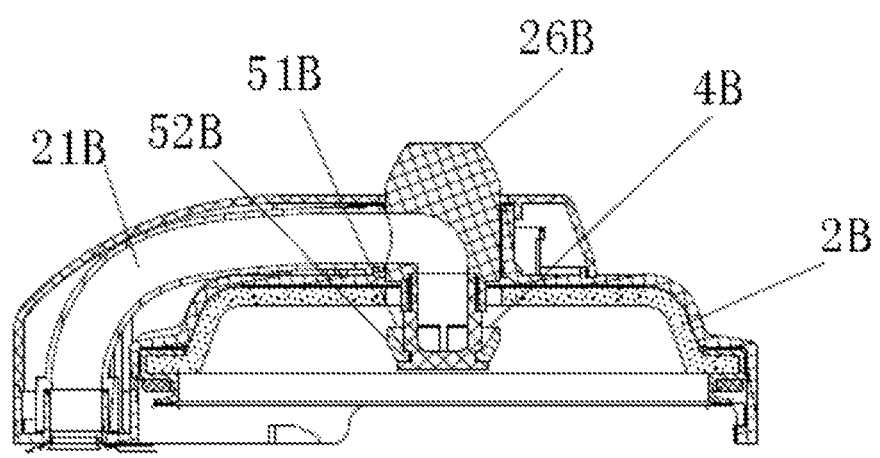
FIG. 6 is a schematic view showing the specific structure of the cup lid in FIG. 5.
Figure 7:
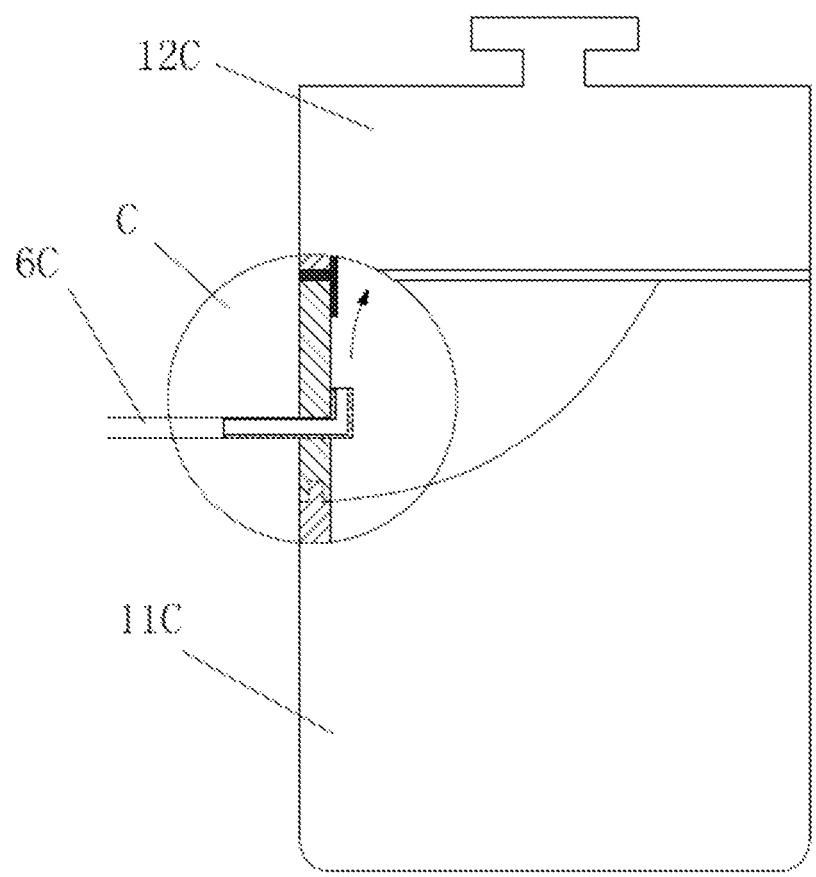
FIG. 7 is a schematic view showing the structure of another water outlet of a cup body of a self-cleaning food processor according to an embodiment of the present application.
Figure 8:
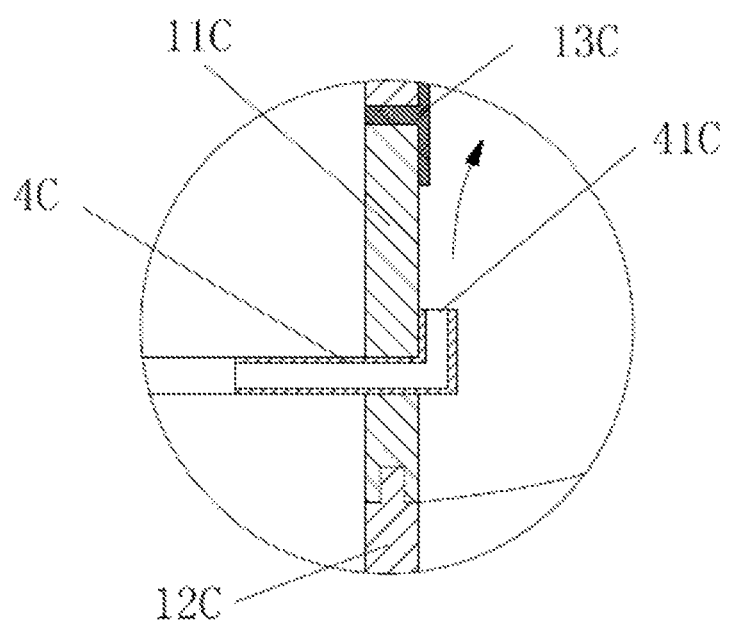
FIG. 8 is a partially enlarged view of a portion C in FIG. 7.
Figure 9:
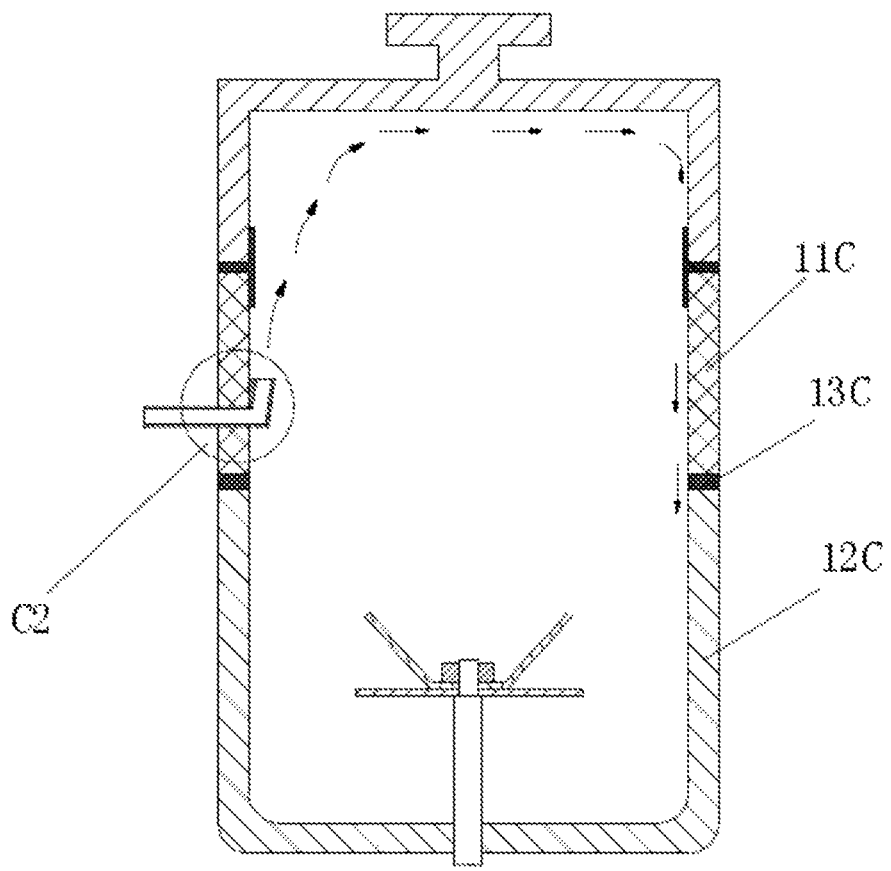
FIG. 9 is a schematic structural view showing the structure of a water outlet of a cup body of a self-cleaning food processor according to an embodiment of the present application.
Figure 10:
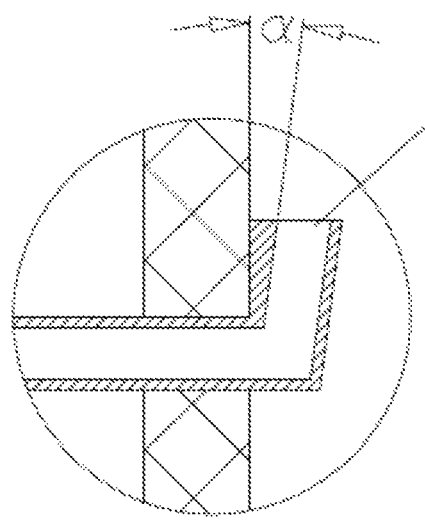
FIG. 10 is a partially enlarged view of a portion C2 in FIG. 9.
Figure 11:
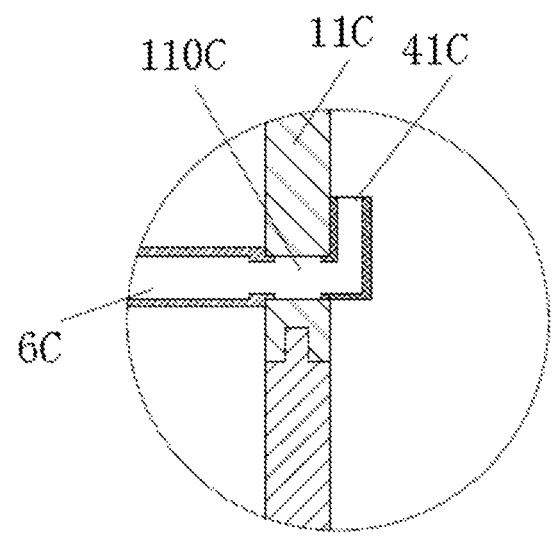
FIG. 11 is a schematic structural view of a matching structure of the water outlet and the cup body of the self-cleaning food processor according to the embodiment of the present application.

Of course, the water outlet may also be arranged on the cup lid, as shown in FIGS. 5 and 6.

A cup lid 2B is provided with a pipeline 21B and a spray device, wherein the spray device is mounted at one end of the pipeline 21B and extends into the crushing cavity, and a spray port 4B of the spray device faces an inner surface of the cup lid 2B, and the spray port here is the water outlet.

The spray port 4B of the spray device faces the inner surface of the cup lid 2B, and the cleaning water entering the pipeline 21 from another end of the pipeline 21 is directly sprayed onto the inner surface of the cup lid 2B from the spray port 4B, to directly wash the inner surface of the cup lid 2B, which may better clean the inner surface of the cup lid 2B, and thoroughly clean residual particles such as bean dregs on the inner surface of the cup lid 2B, thus there's no need for the user to manually clean the inner surface of the cup lid 2B after the cleaning process is completed, and thereby effectively improving the practicability of the food processor.

The spray device includes a spray head 51B provided with a water outlet arranged on a side wall of an lower portion thereof, wherein an upper end of the spray head 51B is connected with one end of the pipeline 21B, and a lower end of the spray head 51B extends into the crushing cavity; and a silicone ring 52B sleeved at the lower end of the spray head 51B, wherein the water is outputted in a direction rightly toward a side wall of the silicone ring 52B. A spray cavity with an upward opening is defined by enclosure of the silicone ring 52B and the spray head 51B, and the opening of the spray cavity is the spray port 4B. Besides, an inner diameter of the silicone ring 52B gradually increases from bottom to top, and the spray head 51B is rotatably mounted on the one end of the pipeline 21B. The cleaning water sprayed from the water outlet is sprayed onto the side wall of the silicone ring 52B and deflected upward onto an inner top surface of the cup lid 2B, so as to wash the inner top surface of the cup lid, thus ensuring that the inner top surface of the cup lid can be better washed.

An included angle between the side wall of the silicone ring 52B and the side wall of the spray head 51B ranges from 22.5° to 60°, so as to achieve the best cleaning effect. If the included angle between the side wall of the silicone ring 52B and the side wall of the spray head 51B is too small, a washing resistance is too large, and the cleaning water may not be easily transported upward in the pipeline 21B, which is not conducive to the spraying of the cleaning water from the spray port 4B, and thus the cleaning effect of the inner surface of the cup lid 2B is not ideal If the included angle between the side wall of the silicone ring 52B and the side wall of the spray head 51B is too large, the cleaning water is not easy to be sprayed onto the inner surface of the cup lid 2B, and the washing force is also small, thus the cleaning effect of the inner surface of the cup lid 2B is also not ideal.

Moreover, a distance between an upper end of the silicone ring 52B and the inner top surface of the cup lid 2B ranges from 3 to 8 mm. If the above distance is too small, the washing resistance may be too large, and the cleaning water may not be easily transported upward in the pipeline 21, which is not conducive to the spraying of the cleaning water from the spray port 4B, and the cleaning effect of the inner surface of the cup lid 2B is not ideal. If the distance is too large, the cleaning water may not be sprayed onto the inner surface of the cup lid 2B, and the cleaning effect of the inner surface of the cup lid 2B is also not ideal.

In the above solution, the water outlet is simply provided on the cup lid. Of course, for further improvements, a spray pipe may be further arranged at the spray head. The spray pipe is mounted at the lower end of the spray head, and the spray port is located at an end of the spray pipe and faces the inner surface of the cup lid, so as to wash the inner surface of the cup lid. Of course, the spray pipe may also be rotatably sleeved at the lower end of the spray head. In this way, the cup lid may be scoured during the scouring process. Of course, the pipeline 21B may be hidden in the cup lid as shown in FIGS. 5 and 6, where there is a certain path in the cup lid, of course, it may also directly pass through the cup lid.

That is, in addition to the above-mentioned ways, there are many variable forms for setting the water outlet. For more clear illustration, several variations of setting the water outlet in the cup body are described further in this embodiment.

For example, the cup body includes a lower housing and an upper housing integrally sealed with an upper end of the lower housing, and the nozzle is located on a wall of the upper housing.

As shown in FIGS. 7 to 11, a material of the upper housing 11C is different from that of the lower housing 12C, the lower housing 12C is a barrel-shaped glass component, and the upper housing 11C is a plastic component. The lower housing 12C and the upper housing 11C are integrally molded by injection molding, so as to realize the sealing connection between the upper housing 11C and the lower housing 12C. In addition, the upper housing 11C is a curved plate having an opening at one side in a circumferential direction, and a connection surface between the upper housing 11C and the lower housing 12C is a curved surface, thus forming an appearance that a large part of the whole container is transparent and a small part of the whole container is non-transparent. Wherein, the nozzle 4C is directly inserted in the wall of the upper housing 11C and is in interference sealing with the upper housing 11C. In this embodiment, an upward spout 41C, that is, the water outlet, is lower than an upper end surface of the upper housing 11C, so as to prevent the cup lid 2C from colliding with the nozzle 4C when the cup lid 2C is being taken away or placed back.

Since the nozzle is arranged on the wall of the upper housing, and one end of the nozzle is provided with the upward spout configured for spraying cleaning liquid toward the inner surface of the top wall of the cup lid, when cleaning water or other cleaning liquids are introduced into the nozzle, the cleaning water is sprayed onto the top wall of the cup lid through the upward spout to wash and clean the inner surface of the top wall of the cup lid.

Especially in a case that the cup body is made of fragile materials such as glass or the like, since a hole is required to be provided on a peripheral wall of the crushing cup and sealing treatment is required to be performed to allow the nozzle to be arranged at the peripheral wall of the cup body, the manufacturing process is difficult, and problems of container damage or sealing failure is prone to occur, leading to a relatively large rejection rate. Therefore, upper and lower housings may be provided. In a case that the lower housing is made of fragile materials such as glass or the like, the nozzle may be arranged at the non-fragile upper housing, which not only ensures the overall aesthetic appearance of the container, but also realizes the mounting and sealing of the nozzle.

Moreover, the lower housing is made of glass, which makes it more convenient for consumers to observe the process of making food inside, and thereby improving the consumers' pleasure in use. In addition, the upper housing is not a circumferentially closed structure, the connection surface between the upper housing and the lower housing is a curved surface, and a projection of the curved surface projected onto a vertical plane is a curved line, therefore, the upper housing also functions as a decorative piece, which improves aesthetic characteristics of the whole machine. Of course, in this embodiment, the cup lid may also be a transparent cup lid. Of course, the materials of the upper and lower housings are not limited to the plastics and glass mentioned in this embodiment.

Of course, variably, the upper housing 11C may be a barrel-shaped structure which is through from top to bottom and is circumferentially closed, and a sealing ring 13C is provided between the upper housing 11C and the lower housing 12C, to seal a clearance between the upper housing 11C and the lower housing 12C. Besides, the cleaning liquid sprayed from the upward spout 41C, that is, the water outlet, is sprayed obliquely toward the top wall of the cup lid.

In this modified solution, the requirement of a vertical maximum distance between the upward spout and the inner surface of the top wall of the cup lid is consistent with that of the water outlet arranged at the side wall of the cup body, which is not described in detail herein.

In this case, the cleaning water sprayed from the upward spout is sprayed obliquely toward the top wall of the cup lid relative to the vertical plane, which is more beneficial for the cleaning water to have an inertial component force for scouring along an edge of the top wall of the cup lid when the cleaning water impacts the top wall of the cup lid, so that the cleaning water may be dispersed to clean the edge of the top wall of the cup lid and flow down along the peripheral wall of the cup lid. It is required that a spraying inclination angle $\alpha \leq 15°$. Specifically, if a is greater than 15°, the sprayed cleaning water may not be able to clean the top wall of the cup lid, or may not be able to completely clean the top wall of the cup lid, resulting in the possibility of incomplete cleaning. Therefore, in this embodiment, the spraying inclination angle $\alpha$ preferably ranges from 5° to 12°.

Of course, variably, a through hole 110C is provided in the wall of the upper housing 11C. The upward spout 41C is in communication with one end of the through hole 110C, and the nozzle is formed by the upward spout 41C and the through hole 110C.

Generally, a wall thickness of the upper housing is relatively large, and the nozzle is formed by the combination of the through hole and the upward spout. Of course, connecting ends among the through hole, the upward spout and the connecting pipeline are required to be sealed, so as to prevent leakage of the cleaning water. Besides, the nozzle may only be a through hole arranged in the upper housing, in this case, an outlet end of the through hole is required to be inclined toward the cup lid, so as to spray cleaning water towards the cup lid to scour the cup lid. In addition, the wall of the upper housing may be provided with multiple through holes configured to spray toward the cup lid. For example, the multiple through holes are arranged to circumferentially surround the upper housing, to realize scouring and cleaning of the top wall of the entire cup lid.

As another modified solution in which the water outlet is arranged at the cup body, the cup body includes a transition piece, the transition piece is located above the cup body and integrally sealed with the upper end of the cup body, the nozzle is located at the wall of the transition piece, and the nozzle runs through the wall of the transition piece to extend into a space defined by enclosure of the cup lid, the transition piece and the cup body.

Figure 12:
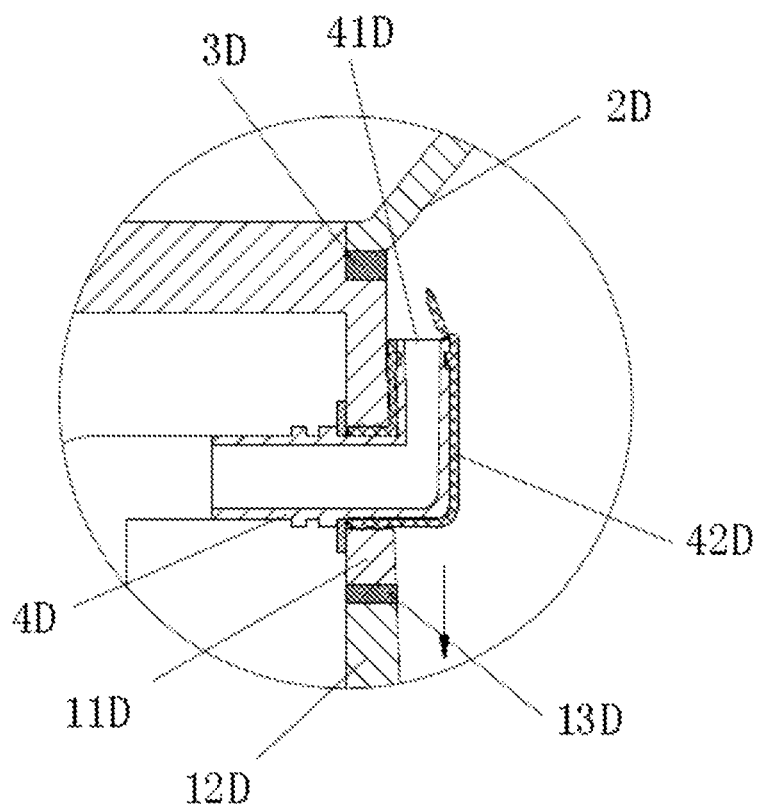
FIG. 12 is a schematic view showing the structure of a water outlet of a cup body of a self-cleaning food processor according to an embodiment of the present application.
Figure 13:
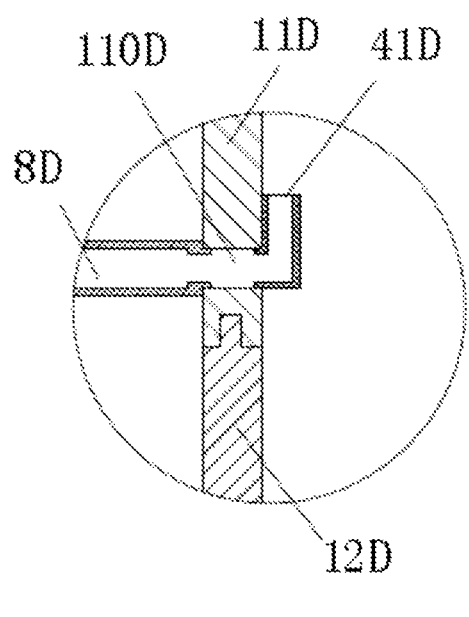
FIG. 13 is a schematic view showing a modified structure of a water outlet matching structure in FIG. 12.
Figure 14:
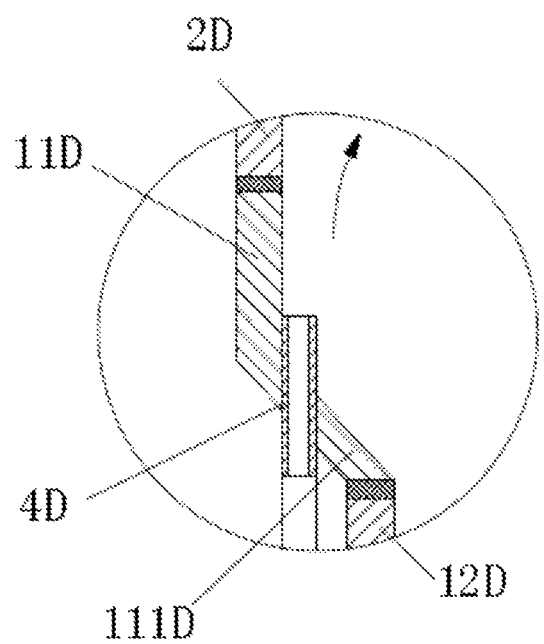
FIG. 14 is a schematic view showing another modified structure of the water outlet matching structure in FIG. 12.

As shown in FIGS. 12-14, a transition piece 11D is located above a cup body 12D and is integrally sealed with an upper end of the cup body 12D; a cup lid 2D covers the transition piece 11D and is hermetically connected with the transition piece 11D through a sealing member 3D; a nozzle 4D located eat a wall of the transition piece 11D, the nozzle 4D runs through the wall of the transition piece 11D and extends into the space defined by enclosure of the cup lid, the transition piece 11D and the cup body 12D; an upward spout 41D, i.e., the water outlet, is arranged at a water output end of the nozzle 4D, and is configured for spraying cleaning water toward the inner surface of the top wall of the cup lid to clean the cup lid and the cup body 12D. The upward spout 41D is lower than an upper end surface of the transition piece 11D, so as to prevent sealing failure of the nozzle 4D due to collision between the cup lid and the upward spout 41D when the cup lid is being closed or opened.

Of course, variably, the nozzle 4D is inserted in the wall of the transition piece 11D by interference fit, and the upward spout 41D is arranged to be inclined toward the top wall of the cup lid, and the cleaning water sprayed from the upward spout 41D is sprayed obliquely toward the top wall of the cup lid.

In this embodiment, the cleaning water sprayed from the upward spout is sprayed obliquely toward the top wall of the cup lid relative to the vertical plane, which is more beneficial for the cleaning water to have an inertial component force for scouring along an edge of the top wall of the cup lid when the cleaning water impacts the top wall of the cup lid, so that the cleaning water may be dispersed to clean the edge of the top wall of the cup lid and flow down along the peripheral wall of the cup lid. The requirement of the spraying inclination angle is consistent with that in the previous embodiment, which will not be repeated here.

Of course, variably, the transition piece 11D and the cup body 12D may also be integrally formed by secondary injection molding, to realize sealing between the transition piece 11D and the cup body 12D. Compared with the above embodiments, there is no need to provide a separate sealing ring structure in this case. Besides, the wall of the transition piece 11D is provided with a through hole 110D, the upward spout 41D is in communication with a water outlet end of the through hole 110D, and the nozzle is formed by the upward spout 41D and the through hole 110D. Of course, variably, the transition piece 11D has an inwardly contracted transition part 111D, which is hermetically connected with the upper end of the cup body 12D, and the nozzle 4D runs through the transition part 111D from an outer side of a bottom portion of the transition part 111D to spray cleaning water toward the top wall of the cup lid 2D, so as to wash and clean the cup lid and the cup body. The nozzle is of a straight tubular shape, and vertically runs through the transition part and extends into the space defined by enclosure of the cup lid, the transition piece and the cup body, to wash and clean the inner surface of the top wall of the cup lid. In this case, the upward spout of the nozzle is vertically arranged toward the top wall of the cup lid. Of course, in this embodiment, the nozzle may also obliquely run through the transition part and extend into the space defined by enclosure of the cup lid, the transition piece and the cup body, so that the upward spout can obliquely spray cleaning water to clean the top wall of the cup lid.

Further improvements may be made to the above water outlet in this embodiment. Since the water outlet is in the crushing cavity, the slurry is easy to enter the water outlet during the operating process. Of course, there are also solutions of providing the nozzle cover in the aforementioned solutions and the nozzle cover can certainly be provided in each of the solutions of the water outlet. More preferably, a silicone sleeve is arranged outside the nozzle, and part of the silicone sleeve is located between the side wall of the cup body and the nozzle. The silicone sleeve may be closely attached to both the side wall of the cup body and the nozzle due to its soft texture, thus avoiding hidden dregs. The nozzle cover may be a part of the silicone sleeve, and a thickness of the nozzle cover ranges from 0.5 to 2 mm, the nozzle cover is easy to be damaged when it is too thin, and is difficult to be opened when it is too thick. In addition, the nozzle cover is provided with a vent hole in communication with an inside of the nozzle, to prevent negative pressure from being generated in the cleaning pipeline when the wastewater is discharged after cleaning, so that the water in the cleaning pipeline can be completely discharged. A size of the vent hole should be appropriate, if it is too small, it may be easily blocked; and if it is too large, the slurry or materials may enter the pipeline during crushing. Preferably, a diameter of the vent hole ranges from 1 to 3 mm. It should be understood that, in addition to being of a circular hole shape, the vent hole may also be of other shapes, or, the vent hole may also be a notch at an edge of the nozzle cover.

The above process relates to improvements of the water outlet. Of course, the improvements of the water outlet is for better washing and cleaning of the crushing cavity, and in order to further improve the washing effect, the cleaning water entering from the water outlet may be pressurized and sprayed with pressure.

Undoubtedly, the most basic water outlet may be connected with a water supply unit, and the water supply unit is configured to supply water. The solution may also be that, the crushing cavity is provided with a liquid discharge port which is in communication with the water outlet through a communication valve, and the crushing device drives the cleaning water to flow from the liquid discharge port to the water outlet and be sprayed onto the inner surface of the crushing cavity, so that cyclic cleaning may accordingly be formed. In this case, the pressure generated by the crushing cutter driving the cleaning water may be used to form the circulation, and the pressure may be increased by adjusting the rotating speed of the crushing cutter, so as to achieve the effect of pressurized spray cleaning.

Figure 15:
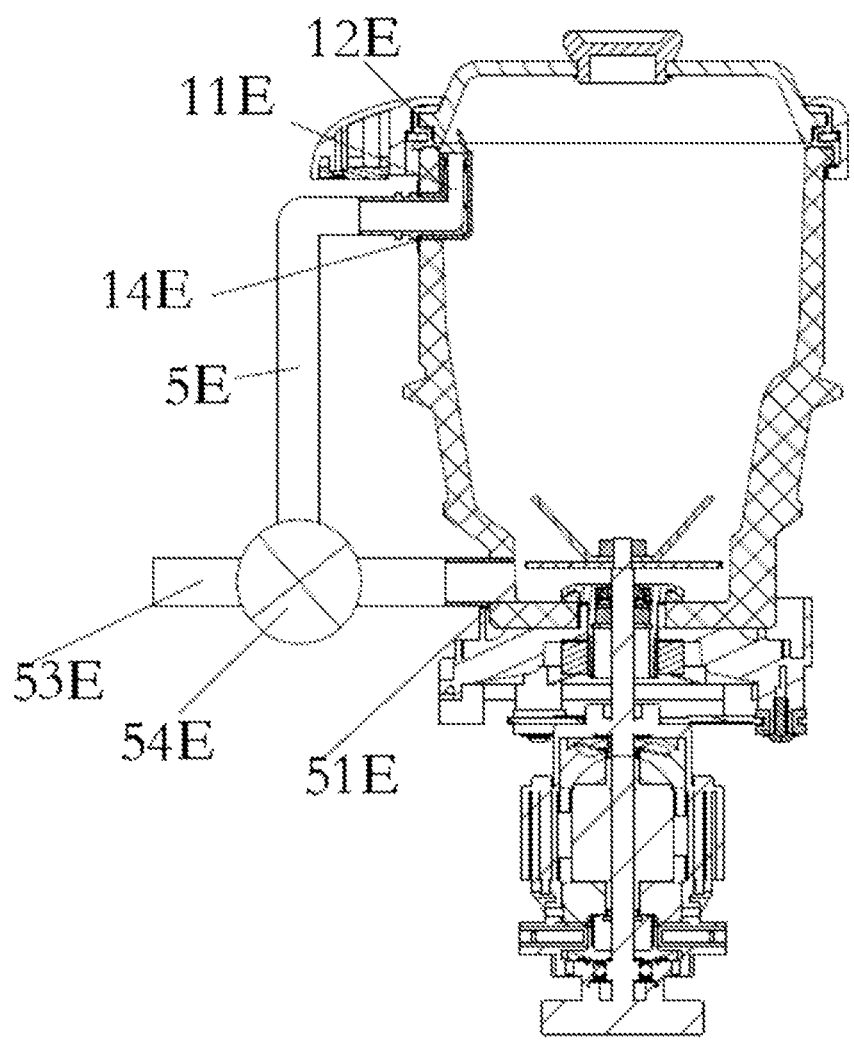
FIG. 15 is a schematic view of a circulation structure of an embodiment of the present application.

For the cyclic cleaning, as shown in FIG. 15, a nozzle 11E further includes a connecting pipe 14E for connecting an external pipeline of the cup body, and the external pipeline and the connecting pipe 14E together constitute a cleaning pipeline 5E. Specifically, a through hole 51E for the cleaning pipeline 5E to pass through is provided in the side wall of the cup body. The cleaning pipeline 5E is in communication with the crushing cavity through the through hole 5E. During the cleaning process, the crushing cutter at the bottom of the cup body rotates, so that the cleaning water obtains kinetic energy and is ejected from a water outlet 12E through the cleaning pipeline 5E, thereby completing the cleaning cycle in the cup body. This circulation structure which realizes the cleaning by virtue of the external pipeline can complete the whole cleaning with less water, which, on one hand, eliminates the waste of water resources, and on the other hand, is also beneficial to the improvement of the cleaning effect to a certain extent due to a low water level in the cup body. Specifically, during the rotation of the crushing cutter, the air above the liquid surface may be drawn into the water flow, and the bubbles move together with the water flow. In the movement path, sizes and pressures of the bubbles may constantly change, so the bubbles may grow and break continuously. Especially, when the bubbles hit the inner wall of the cup body, since the inner wall has a certain amount of heat, and a velocity and a direction of the water flow change sharply at this region, the probability of bubble growth and burst is higher than that of other regions. At the moment of bursting of the bubbles, a huge instantaneous pressure may be generated, which may impact the materials adhered to the inner wall of the container, thus leading to a good cleaning effect. Instead, cleaning with a high water level has no above effect or only has poor effect. Further, a drain pipeline 53E may be provided outside the cup body, and accordingly, one of the cleaning pipeline 5E and the drain pipeline 53E is in communication with the through hole 51E via a switching valve 54E. In the cleaning process, the cleaning pipeline 5E communicates with the through hole 51E via the switching valve 54E, and after a cleaning cycle is completed, the drain pipeline 53E communicates with the through hole 51E via the switching valve 54E, so as to discharge the cleaning liquid in the cup body. In order to ensure the cleaning effect, the above process is generally more than one time and no more than five times, to realize automatic cleaning, one or two or three or four or five times is preferred.

Of course, the pressure may not necessarily be generated by circulation. The cleaning water of the water outlet may be obtained by circulation, or by other water sources, such as water tanks or other water sources. In order to better improve the effect of pressurized cleaning, a water pumping device may be further provided.

The water pumping device is in communication with the water outlet through a pipeline, and is used to perform intermittent pressurized water spray from the water outlet to the inner surface of the crushing cavity.

The water pumping device is in communication with the water outlet through the pipeline, during cleaning, the water pumping device intermittently pumps water, and the water is intermittently sprayed from the water outlet to the inner surface of the crushing cavity. An impact force of spray is large, substances adhered to the inner surface of the crushing cavity are easier to be impacted off and accumulated at the bottom of the crushing cavity together with the water flowing down the inner surface of the crushing cavity, thus the cleaning effect of the inner surface of the crushing cavity is better, and the crushing cavity is easier to be fully cleaned.

Optionally, as shown in FIGS. 16 to 21, the water pumping device includes: a water pumping mechanism 210, which communicates with the water outlet through a pipeline; and a driving mechanism 220, which drivingly cooperates with the water pumping mechanism 210 for driving the water pumping mechanism 210 to pump and draw water.

The driving mechanism 220 may be an automatic driving mechanism 220 configured to automatically spray water into the crushing cavity. Of course, the driving mechanism 220 may also be a manual driving mechanism 220, which sprays water into the crushing cavity by manual operation of the user. Both the above two manners can achieve the purpose of this application, and the purpose thereof does not deviate from the design concept of the present invention, which will not be repeated here, and both should fall within the protection scope of this application.

The water pumping mechanism 210 includes: a piston cylinder 211 having a water inlet connecting port and a water outlet connecting port, the water outlet connecting port communicates with the water outlet through a first pipeline, and the water inlet connecting port communicates with the water supply device through a second pipeline; and a piston 212 which is movably mounted in the piston cylinder 211, and the driving mechanism 220 drives the piston 212 to reciprocate. Besides, a first control valve is arranged in the first pipeline, and a second control valve is arranged in the second pipeline. The first control valve and the second control valve may be solenoid valves or check valves.

By pulling the piston 212, the first control valve is closed and the second control valve is opened, a negative pressure is formed inside the piston cylinder 211, water is drawn into the piston cylinder 211 from the water inlet connecting port, and the water enters into the piston cylinder 211. By pushing the piston 212, the first control valve is opened and the second control valve is closed, a positive pressure is formed inside the piston cylinder 211, the piston 212 presses the water in the piston cylinder 211 into the crushing cavity from the water outlet connecting port. The above process is repeated to intermittently spray water under pressure into the crushing cavity. Due to the large impact force of spray of the pumped water, the water impacts the inner surface of the crushing cavity, and the substances adhered to the inner surface of the crushing cavity are easier to be impacted off. The adhered substances which are washed off are then accumulated at the bottom of the crushing cavity together with the water flowing down the inner surface of the crushing cavity, and finally discharged from the crushing cavity, so that the cleaning effect of the inner surface of the crushing cavity is better, and the crushing cavity is fully cleaned.

Optionally, as shown in FIGS. 17 and 18, the piston 212 is connected with a piston rod 213, and a side wall of an end of the piston rod 213 extending out of the piston cylinder 211 is provided with a matching hole. The driving mechanism 220 includes a driving motor 222 and a cam 221, the cam 221 is mounted on the driving motor 222 and extends into the matching hole, and the driving motor 222 drives the cam 221 to rotate. During the rotation of the cam 221, the piston 212 may be pulled outward with respect to the piston cylinder 211 through the piston rod 213, so that the water can be drawn by the water pumping mechanism 210, during the rotation of the cam 221, the piston 212 may also be pushed inward with respect to the piston cylinder 211 through the piston rod 213, so that the water can be pumped by the water pumping mechanism 210.

Figure 19:
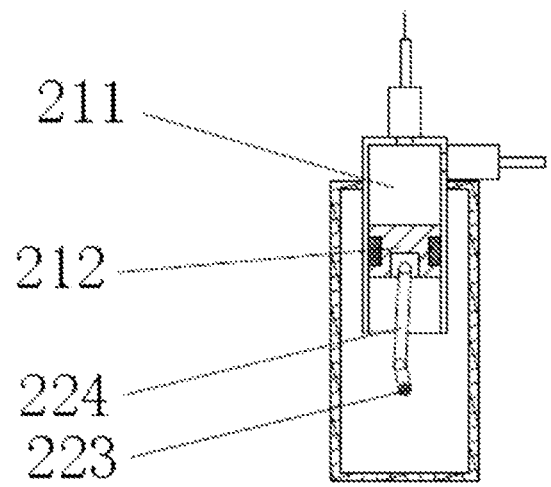
FIG. 19 is a schematic view showing the structure of another type of pressure device of a self-cleaning food processor according to an embodiment of the present application.
Figure 20:
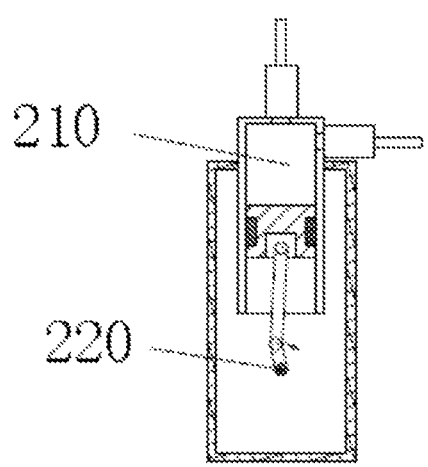
FIG. 20 is a schematic view showing the structure of the pressure device in FIG. 19 when the pressure device pumps water.
Figure 21:
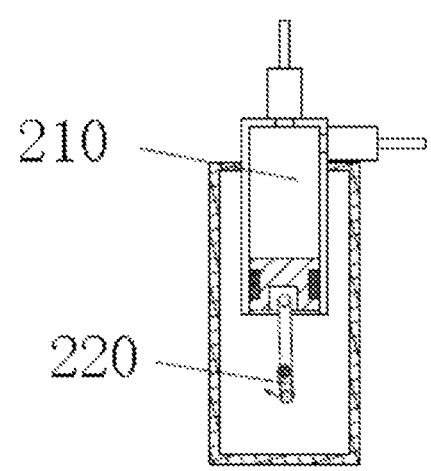
FIG. 21 is a schematic view showing the structure of the pressure device in FIG. 19 when the pressure device draws water.

Optionally, as shown in FIGS. 19 to 21, the driving mechanism 220 includes a driving motor, a crank 223 and a connecting rod 224. The crank 223 has one end mounted on the driving motor and another end hinged with one end of the connecting rod 224, another end of the connecting rod 224 is hinged with the water pumping mechanism 210, and the driving motor drives the crank 223 to rotate. During a swing process of the connecting rod 224, the piston 212 may be pulled outward with respect to the piston cylinder 211, so that the water can be drawn by the water pumping mechanism 210; and during the swing process of the connecting rod 224, the piston 212 may also be pushed inward with respect to the piston cylinder 211, so that the water can be pumped by the water pumping mechanism 210.

Specifically, as shown in FIGS. 16 to 21, an annular groove is provided on the piston 212, and a sealing ring is sleeved in the annular groove. An outer surface of the sealing ring abuts against an inner surface of the piston cylinder 211 to seal a gap between the piston 212 and the piston cylinder 211. The crushing cavity includes a crushing cup and a cup lid with a volume-increasing cavity, and the cup lid is mounted on the crushing cup. The water outlet may be located on a side wall of the cup lid, or may be located on a top wall of the cup lid, or may be located on a side wall of the crushing cup, or may also be located on a bottom wall of the crushing cup, etc. All of the above solutions can achieve the purpose of this application, and are not deviated from the design concept of the present invention, which will not be repeated here, and should fall within the protection scope of this application.

The food processor may further include a spray head which is rotatably mounted in the crushing cavity, the water outlet is located on the spray head and is able to spray water towards the top wall and an upper side wall of the crushing cavity, so as to impact off substances adhered to the top wall and the upper side wall of the crushing cavity, thus better improving the cleaning effect of the food processor.

Specifically, multiple water outlets are arranged at the spray head at intervals along the circumferential direction, and axes of the multiple water outlets are all deflected relative to a center of the spray head and all face a same side in the circumferential direction, in this way, the spray head can be driven to rotate during the process of spraying water from the multiple water outlets, so that the multiple water outlets can spray water toward different positions in the crushing cavity.

The food processor may further include a crushing motor with a hollow shaft as its rotating shaft, which is located at a lower portion of the crushing cavity, and the hollow shaft runs through the bottom wall of the crushing cavity and extends into the crushing cavity; and a crushing device, which is located inside the crushing cavity and mounted on the hollow shaft. The crushing device is provided with a water passage and a water outlet, and the water outlet is in communication with the hollow shaft through the water passage. The first pipeline is connected with the hollow shaft and the water pumping device, and the water outlet is able to spray water toward the top wall and the upper side wall of the crushing cavity, so as to impact off substances adhered to the top wall and the upper side wall of the crushing cavity, thereby better improving the cleaning effect of the food processor.

It should be noted that, a pressure P of the cleaning water sprayed from the water outlet is not less than 100 kPa, because in the pulping process, for some large block of materials adhered to the cavity wall, such as rice grains, fruit peel, bean skin and the like, may not be crushed by the cutter during the crushing process due to their strong adhesion, if the pressure P of the cleaning water sprayed from the water outlet is too small and less than 100 kPa, the large materials with strong adhesion on the cavity wall may not be washed away. Therefore, in the present application, it is required that P is not less than 100 kPa, and preferably, P ranges from 300 kPa to 600 kPa in the embodiments of the present application. When sit is within this range, most of the materials may be easily washed away. Of course, for the embodiments of the present application, P should not exceed 600 kPa, because the higher the pressure, the higher the strength requirement of the water pumping device, and the cost of the whole machine may increase significantly. In addition, the excessive pressure of the cleaning water sprayed from the water outlet may easily cause serious splashing phenomenon, and there may also be the problem of excessive waste of the cleaning water. It should further be noted that for the embodiments of the present application, a pressure gauge may be provided in the piston cylinder for detecting the pressure of water, and the pressure of the water inside the piston cylinder may be adjusted by adjusting the size of the water outlet and the operating speed of the driving mechanism.

In addition to the above improvements in the cleaning process, the water outlet, and the spraying, in order to better improve the crushing effect when the crushing cutter drives the cleaning water, the environment of the crushing cavity may also be further improved.

Figure 22:
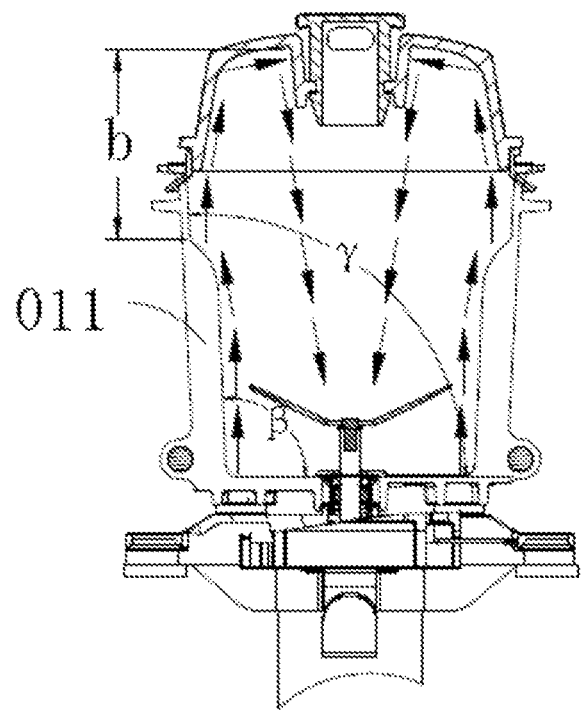
FIG. 22 is a schematic view showing the specific structure of a cup body of a self-cleaning food processor according to an embodiment of the present application.
Figure 23:
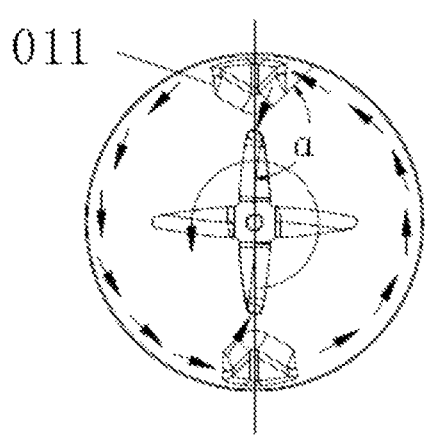
FIG. 23 is a schematic view showing the specific structure of the cup body of the self-cleaning food processor according to the embodiment of the present application.

As shown in FIG. 22, in this embodiment, the side wall of the cup body is provided with a spoiler rib 011, and the spoiler rib 011 extends downward to the bottom of the cup body. An included angle γ between the side wall of the cup body and the bottom of the cup body is greater than 90°, and an included angle β between a longitudinal section line of the spoiler rib 011 and the bottom of the cup body is greater than 90°.

Since the side wall of the cup body is provided with the spoiler rib, and the spoiler rib extends downward to the bottom of the cup body, during the cleaning process of the food processor, when the crushing cutter rotates at a high speed, the cleaning liquid in the cup body is driven to rotate centrifugally at a high speed, and the cleaning liquid moves along the side wall of the cup body and comes into contact with the spoiler rib on the side wall of the cup body. At this time, both a flow direction and a flow rate of the cleaning liquid are changed, and part of the liquid flow may move along an obstructing oblique surface of the spoiler rib. As shown in FIG. 22, the arrow indicates that the cleaning liquid climbs to the cup mouth of the cup body along the oblique surface of the spoiler rib, forming a V-shaped liquid surface region. When the cleaning liquid sweeps across the cup wall of the cup body, it may wash away the slurry stains and residues from the cup wall. Because the spoiler rib of the cup body extends to the bottom of the cup body, more cleaning liquid climbs to the cup mouth of the cup body due to the obstruction of the bottom of the cup body, to rush to the cup lid and clean the cup lid. Besides, as the rotating speed of the crushing cutter gradually decreases, the cleaning liquid flows back downward along the cup wall under the action of gravity, thus forming secondary washing of the cup wall. Moreover, after repeated rotation and stopping of the crushing cutter, cyclic cleaning of the whole crushing region is achieved by the cleaning liquid.

In addition, part of the liquid may rush to a central region, since the spoiler rib on the side wall of the cup body extends to the bottom of the cup body, the flow rate of this part of the cleaning liquid becomes greater. In addition, when the crushing cutter rotates at a high speed, a central region of the crushing cutter is in a vacuum state, in this case, the motor shaft and part of the crushing cutter in the vacuum region cannot be washed by the water flow, while bean dregs are more likely to be bonded in this region due to high temperature during pulping, therefore, by extending the spoiler rib on the side wall of the cup body to the bottom of the cup body, the motor shaft and the crushing cutter in the vacuum region can be effectively cleaned. If the spoiler rib does not extend to the bottom of the cup body, the liquid flow below the spoiler rib may move circumferentially, and the scouring effect of the liquid flow on the motor shaft and the crushing cutter is poor.

In this embodiment, the included angle between the side wall of the cup body and the bottom of the cup body is greater than 90°, that is, the side wall of the cup body is inclined in this case. Regarding the flow direction of the cleaning liquid, the liquid flow may climb easier due to the inclination, the component force may be larger, and a total height of the cup body is reduced on the premise of meeting a corresponding volume. In this case, it is equivalent that a height that the cleaning liquid has to climb is reduced, which is equivalent to reducing the work required to be done by the cleaning liquid. Under the same circumstances, a height to which the cleaning liquid climbs may increase, and the impact on the cup lid also increases, thus further improving the cleaning effect.

For the spoiler rib, the included angle between the longitudinal section line of the spoiler rib and the bottom of the cup body is greater than 90°, which is more beneficial to the continuous climbing of the liquid flow, thereby preventing the cleaning liquid from being rebounded back to the central region. In order to also better clean regions such as the cup lid and the motor shaft and the like, the included angle between the longitudinal section line of the spoiler rib and the bottom of the cup body is greater than 95° and smaller than 110°.

In this embodiment, as shown in FIGS. 23 to 26, the spoiler rib 011 includes a spoiler surface and a back side surface, and a plane from a junction between the spoiler surface and the back side surface to a center of the cup body is taken as a vertical plane, and an included angle between the spoiler surface and the vertical plane is $\alpha$, and $110° < \alpha < 160°$. The flow direction of the cleaning liquid is shown by the arrow in the figure. In this case, the washing effect on the motor shaft and crushing cutter is the best after the flow direction changes.

In the cleaning process of the food processor, when the crushing cutter rotates at a high speed, the cleaning liquid in the cup body is driven to rotate, and the liquid flow thereof may generate a centrifugal force under the condition of high-speed circumferential movement, and the centrifugal force acts on the inner wall of the cup body. When the liquid flow reaches a certain rotating speed, under the action of centrifugal force, the liquid flow may "climb" upward along the inner wall of the cup body, then "climb" toward the cup lid, and finally return to the bottom of the cup body along the contour of the cup lid. The greater the force of liquid flow rushing to the cup lid, the more beneficial to cleaning of the cup lid. The factors that determine an impact force of the liquid flow rushing to the cup lid include an initial flow rate of the liquid flow and a process resistance, and the process resistance may be adjusted by arranging the spoiler rib, as well as the position and the inclination angle of the spoiler rib.

Regarding the limitation of the initial flow rate, the initial flow rate is determined by the crushing cutter and the rotating speed of the motor. Theoretically, the higher rotating speed of the motor, the more violently the crushing cutter stirs the water. In a case that the motor rotates too fast, most of the water is thrown to an upper region, the water around the crushing cutter may sometimes become more and sometimes become less, and the problem of unstable circulation of the cleaning water may occur, which may cause noises of the machine. Therefore, considering the cleaning efficiency and stable circulation of the water, in this embodiment, when the motor drives the crushing cutter to clean the cup body, the rotating speed of the motor is not more than 20000 revolutions per minute and not less than 6000 revolutions per minute. If rotating speed of the motor is too low, a good centrifugal liquid flow may not be formed, and the cup lid may not be better cleaned.

Figure 24:
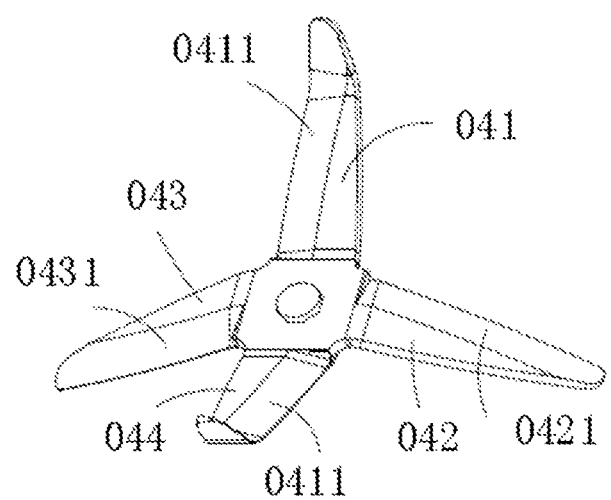
FIG. 24 is a schematic view showing the structure of a cutter of the self-cleaning food processor according to the embodiment of the present application.
Figure 25:
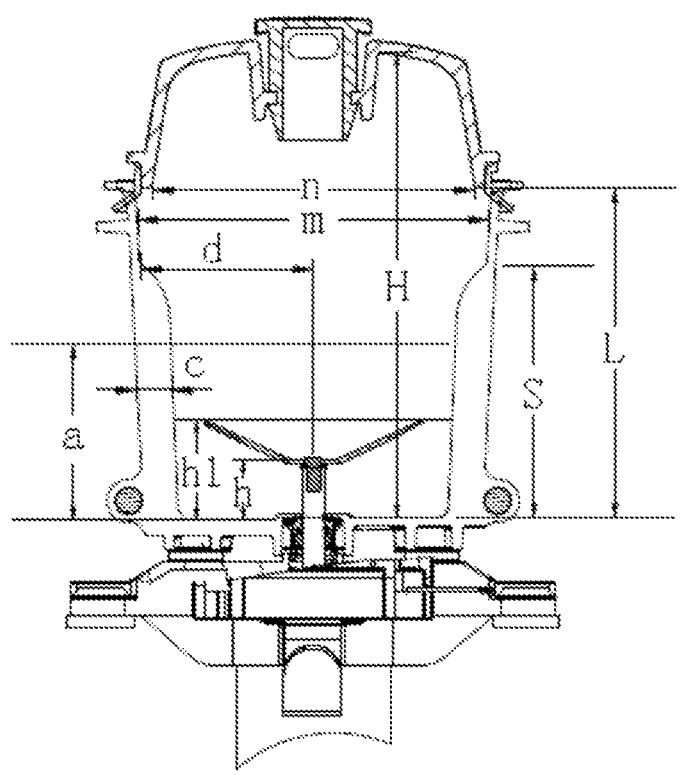
FIG. 25 is a schematic view showing the specific structure of the cup body of the self-cleaning food processor according to the embodiment of the present application.
Figure 26:
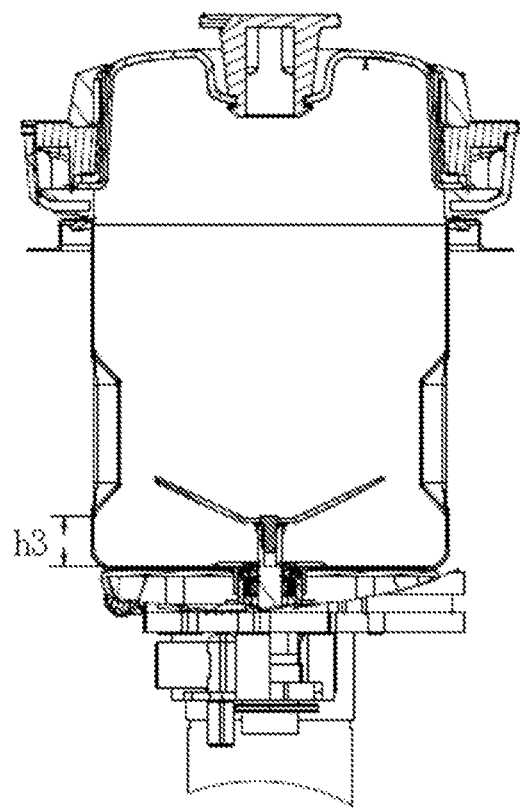
FIG. 26 is schematic view showing the structure of another type of cup body of a self-cleaning food processor according to an embodiment of the present application.

In this case, the crushing cutter includes at least three blades, and each of the blades is provided with a cutting edge, wherein the cutting edge of at least one blade faces the cup lid, and at least one blade of the crushing cutter is bent. Specifically, in this embodiment, taking the solution of four blades as an example, as shown in FIG. 24, reference numerals 041, 042, 043 and 044 indicate the four blades of the crushing cutter, and 0411, 0421, 0431 and 0441 are the cutting edges corresponding to the four blades, the cutting edges face upward. When the crushing cutter is mounted in the food processor, the cutting edges face the cup lid. The blade 041 and the blade 044 are bent blades.

When the motor drives the crushing cutter to rotate in a cutting direction, the liquid flow not only has a circumferential movement driven by the crushing cutter, but also has a vertically upward movement caused by the blades and the cutting edges. When the crushing cutter rotates counter-clockwise, it is similar to an impeller that pumps water upward, so that the initial speed of the liquid flow may be increased under the dual action of a centrifugal force of the circumferential movement and a vertically upward pumping force, and in this case, it is more beneficial to cleaning of the cup lid.

Of course, it is not limited that all of the cutting edges of the four blades face upward for achieving the upward pumping force for the liquid flow, the above effect may also be achieved by the cutting edge of at least one blade facing upward, and the effect is just not obvious. If the cutting edges of the four blades all faces downward, the water around the crushing cutter moves from top to bottom, that is, the water first rushes to the bottom of the cup body and then moves upward along the side wall. This manner of movement, in a case that the spoiler rib extends to the bottom of the cup body, may cause great obstruction to the movement of the water flow, so that the liquid flow can hardly scour the cup lid completely, or the scouring force is very small. In a case that all the above feature requirements are met, a best state of the liquid flow washing the cup lid is achieved, and the liquid flow may form a powerful circumferential rotation effect on the cup lid under the dual action of circumferential movement and the vertical movement.

The crushing cutter is mounted at an end of the motor shaft, a distance between the end of the motor shaft and the bottom of the cup body is h, and a distance between the cup lid and the bottom of the cup body is H, where $H \leq 15h$.

The cleaning of the cup lid is achieved by washing the cup lid through stirring the water by rotation of the crushing cutter. A starting point of the movement of the water flow movement is in a region near h, and a highest point of the movement of the water flow is in a region near H. In a case that $H > 15h$, since the cup body is too high, the speed of liquid flow reaching the cup lid may obviously be decreased, which is equivalent to increasing the process resistance, thus the scouring effect of the water flow on the cup lid is poor.

In this embodiment, a distance between a highest point of the crushing cutter and the bottom of the cup body is h1, and a liquid level in the cup body during cleaning is a, where $h1 \leq a \leq 3h1$.

When the crushing cutter rotates, part of the liquid flow moves upward, and the water around the crushing cutter may be reduced, in this case, the crushing cutter may not fully achieve the stirring effect, so a water level of the water for one time of cleaning is higher than h. If the amount of water is increased, firstly, water resources may be wasted; secondly, an actual load of the crushing cutter may be increased because of the increased amount of water, which is not conducive to the formation of better liquid flow; therefore, $h1 \leq a \leq 3h1$.

In this embodiment, a height of the spoiler rib is S, and a height of the cup body is L, where $S:L \leq 9:10$. If the spoiler rib is too high, the crushing effect may be affected during the food processing process, and more materials may impact the cup lid, which is not only not conducive to the crushing effect, but also increases the residues left on the cup lid.

With the above technical solution, since a food processing region is formed by enclosure of the cup body and the cup lid in the present application, and the cup body and the cup lid are basically in a sealed connection with each other, the food processor is able to drive the liquid in the cup body through the crushing cutter to clean the food processing region by itself without manual intervention, and the operation is safer and more convenient.

For the present application, the side wall of the cup body is provided with the spoiler rib, and the spoiler rib extends downward to the bottom of the cup body. Compared with the prior art, the spoiler rib extends to the bottom of the cup body. In the cleaning process of the food processor, when the crushing cutter rotates at a high speed, the cleaning liquid in the cup body is driven to rotate centrifugally at a high speed, and the cleaning liquid moves along the side wall of the cup body and comes into contact with the spoiler rib on the side wall of the cup body. At this time, both a flow direction and a flow rate of the cleaning liquid may change, and part of the liquid flow may move along the obstructing oblique surface of the spoiler rib. The cleaning liquid climbs to the cup mouth of the cup body along the oblique surface of the spoiler rib, forming a V-shaped liquid surface region. When the cleaning liquid sweeps across the cup wall of the cup body, it may wash away the slurry stains and residues from the cup wall. Because the spoiler rib of the cup body extends to the bottom of the cup body, more cleaning liquid climbs to the cup mouth of the cup body due to the obstruction of the bottom of the cup body, to rush to the cup lid and clean the cup lid. Besides, as the rotating speed of the crushing cutter gradually decreases, the cleaning liquid flows back downward along the cup wall under the action of gravity, thus forming secondary washing of the cup wall. Moreover, after repeated rotation and stopping of the crushing cutter, cyclic cleaning of the whole crushing region is achieved by the cleaning liquid.

In addition, part of the liquid may rush to the central region, since the spoiler rib on the side wall of the cup body extends to the bottom of the cup body, the flow rate of this part of the cleaning liquid becomes greater. In addition, when the crushing cutter rotates at a high speed, the central region of the crushing cutter is in a vacuum state, in this case, the motor shaft and part of the crushing cutter in the vacuum area region cannot be washed by the water flow, while bean dregs are more likely to be bonded in this region due to high temperature during pulping, therefore, by extending the spoiler rib on the side wall of the cup body to the bottom of the cup body, the motor shaft and the crushing cutter in the vacuum region can be effectively cleaned. If the spoiler rib does not extend to the bottom of the cup body, the liquid flow below the spoiler rib may move circumferentially, and the scouring effect of the liquid flow on the motor shaft and the crushing cutter is poor. In this application, the included angle between the side wall of the cup body and the bottom of the cup body is greater than 90°, that is, the side wall of the cup body is inclined in this case. Regarding the flow direction of the cleaning liquid, the liquid flow may climb easier to due to the inclination, the component force may be larger, and a total height of the cup body is reduced to on the premise of meeting a corresponding volume. In this case, it is equivalent that a height that the cleaning liquid has to climb is reduced, which is equivalent to reducing the work required to be done by the cleaning liquid. Under the same circumstances, a height to which the cleaning liquid climbs may increase, and the impact on the cup lid also increases, thus further improving the cleaning effect.

In addition, in the pulping process, when the crushing cutter rotates at a high speed, the gathered materials can be crushed at a high speed, the crushing efficiency is high, and a dregs content of the prepared beverage is small, thus the prepared beverage can be drunk without filtering, and has a delicate taste.

A distance between a top of the spoiler rib and the top of the cup lid is b, $b \geq 10$ mm, and the rotating speed of the motor is not less than 6000 revolutions per minute during cleaning.

The side wall of the cup body is provided with the spoiler rib, and the distance b from the top of the spoiler rib to the top of the cup lid is more than 10 mm. Since the distance is provided between the cup lid and the spoiler rib, when the cleaning liquid climbs to the cup mouth of the cup body, it may circumferentially move to a certain extent along the cup mouth, and moves obliquely upward to form the scouring effect, so as to further clean the cup lid better.

That is, when the crushing cutter rotates at a high speed, the water in the cup body is driven to rotate, and when the liquid flow rotates in a region within the height of the spoiler rib, the direction of the liquid flow may be changed due to obstruction of the spoiler rib. The existence of the spoiler rib destroys the circumferential movement that the liquid flow is supposed to perform under the action of the centrifugal force, and an irregular movement of the liquid flow is formed. When the liquid flow is above the spoiler rib, the liquid flow can perform a stable circumferential movement due to the regular and unobstructed structure in the circumferential direction. The circumferential movement of the liquid flow is beneficial to the cleaning of the cup lid, and the residues on the top of the cup lid can be cleaned in all directions for many times. If the cleaning liquid flow on the cup lid moves irregularly like it moves in the spoiler rib region, blind sides of cleaning may easily appear on the cup lid, and times of washing may not be guaranteed. However, the liquid flow may not perform the stable circumferential movement in all regions above the spoiler rib. When the liquid flow moving in the region within the height of the spoiler rib is switched to move above the spoiler rib, there is a transition region in an axial direction, and the transition region is where the irregular movement of the liquid flow is transformed to the regular movement. Therefore, the distance b from the top of the cup lid to the top of the spoiler rib should be greater than a height of the transition region, so as to ensure the stable and regular circumferential movement of the liquid flow at the top of the cup lid. Since the height of the transition region is about 10 mm, so $b > 10$ mm.

A diameter of the cup mouth of the cup body is m, and a diameter of a lid mouth of the cup lid matched with the cup body is n, where $0.8 \leq m:n \leq 1.2$. In this case, in a process that enclosure is performed by the cup body and the cup lid, a coated and sealed state is substantially provided between the cup body and the cup lid, thus avoiding the problem of inadequate cleaning due to a too large gap between them.

A radial depth of the spoiler rib is c, and a radius of the cup body is d, where $0.06 \leq c:d \leq 0.3$. In this way, the spoiling effect of the spoiler rib in a radial direction is ensured, and thus the crushing effect and the cleaning effect are ensured at the same time.

In addition, the bottom of the spoiler rib may not extend to the bottom of the cup body, in this case, a distance between the bottom of the spoiler rib and the bottom of the cup body is h3, the crushing device is the crushing cutter, and the distance between the highest point of the crushing cutter and the bottom of the cup body is h1, where $h1 \geq h3$.

That is, the crushing cutter is at the spoiling position of the spoiler rib. In the cleaning process of the food processor, when the crushing cutter rotates at a high speed, the cleaning liquid in the cup body is driven to rotate centrifugally at a high speed, and the cleaning liquid may better and directly move along the side wall of the cup body and comes into contact with the spoiler rib on the side wall of the cup body. At this time, both the flow direction and the flow rate of the cleaning liquid are changed, and part of the liquid flow may move along the obstructing oblique surface of the spoiler rib, and the cleaning liquid may climb to the cup mouth of the cup body along the slope of the spoiler rib, forming a V-shaped liquid surface region. When the cleaning liquid sweeps across the cup wall of the cup body, it may wash away the slurry stains and residues from the cup wall. If the position of the spoiler rib is above the crushing cutter, the liquid flow below the spoiler rib may move circumferentially, leading to poor scouring effect of the liquid flow on the motor shaft and the crushing cutter.

In addition, in this embodiment, the food processor is required to be cleaned at least twice, and the liquid level in the cup body should not be lower than h3 during each time of cleaning.

In the process of food processing of the food processor, food residues are not only left on the cup body, but also appear on the cup lid because the food may come into contact with the cup lid when the crushing device processes the food. Therefore, the cup body and the cup lid may be effectively cleaned by washing with water for many times and using a certain amount of cleaning water. Otherwise, if the amount of water is too small, the cup lid may not be cleaned, or if the amount of water is too large, an effective scouring effect may not be formed, and cleaning water resources are also wasted.

In the cleaning process, an infiltration stage, a steaming stage and a cleaning stage are provided to clean different types of residues. In the infiltration stage, the crushing cutter is used to remove large residues first, and the cleaning water is brought into contact with the residues to moisten the residues and achieve the effect of soaking, so that the residues with high adhesion is softened. In the following process, the residues are steamed, which means entering the steaming stage. In the steaming stage, steam is used to further soften the residues on the wall of the crushing cavity, especially in the case that the infiltration is performed in the previous stage, it is ensured that the stubborn residues can be separated from the wall of the crushing cavity. Finally, cleaning is carried out, and thus the overall cleaning may achieve a better effect.

Different amounts of water are used to form a diffusion cleaning stage and a converging cleaning stage, so as to clean different types of residues. By controlling the amount of water in the two stages, different cleaning requirements can be satisfied due to different loads in the process that the crushing cutter drives the cleaning water. In the diffusion cleaning stage, less water is used, so that the cleaning water may achieve a better diffusion effect under the drive of the crushing cutter. In this way, due to the small load, the crushing cutter may diffuse the water to a higher position, to better soak the entire crushing cavity, besides, in the cleaning process, due to the small load, the impact force formed by the cleaning water driven by the crushing cutter is also great, which may generate a spray effect and achieve the effect of washing under pressure, so that the residues with high viscosity may be better cleaned. In the converging cleaning stage, since the amount of water is larger than that in the diffusion cleaning stage, a converged water flow is mainly formed during the rotation of the crushing cutter, which can wash the soaked residues, and the residues are completely separated from the cup body and the cup lid along with the water flow, thus achieving a better cleaning effect.

The residues may be effectively cleaned by spraying the wall of the crushing cavity through the water outlet. The pressure device pumps water intermittently, and the water is sprayed intermittently from the water outlet to the inner surface of the crushing cavity. The impact force of spraying is great, and the substances attached to the inner surface of the crushing cavity are more easily to be washed off by impacting, and flows along with the water flowing down from the inner surface of the crushing cavity to be accumulated at the bottom of the crushing cavity, so that the cleaning effect of the inner surface of the crushing cavity is better, and the crushing cavity is easier to clean. In addition to providing the pressure device, the circulation manner may also be set to spray the cleaning water from the water outlet by driving of the crushing device.

The side wall of the cup body is provided with the spoiler rib, and the spoiler rib extends downward to the bottom of the cup body. Compared with the prior art, since the spoiler rib extends to the bottom of the cup body, in the cleaning process of the food processor, when the crushing cutter rotates at a high speed, the cleaning liquid in the cup body is driven to rotate centrifugally at a high speed, and the cleaning liquid moves along the side wall of the cup body and comes into contact with the spoiler rib on the side wall of the cup. At this time, the flow direction and the flow rate of the cleaning liquid are changed, part of the liquid flow moves along an obstructing oblique surface of the spoiler rib, and the cleaning liquid may climb to the cup mouth of the cup body along the oblique surface of the spoiler rib, forming a V-shaped liquid surface region. When the cleaning liquid sweeps across the cup wall of the cup body, it may wash away the slurry stains and residues on the cup wall. Since the spoiler rib of cup body extends to the bottom of the cup body, more cleaning liquid may climb to the cup mouth of the cup body due to the obstruction of the bottom of the cup body, to rush to the cup lid and clean the cup lid. Besides, as the rotating speed of the crushing cutter is being gradually decreased, the cleaning liquid flows back down along the cup wall of the cup body under the action of gravity, thus forming secondary washing of the cup wall. Moreover, after repeated rotation and stopping of the crushing cutter, cyclic cleaning of the whole crushing region is achieved by the cleaning liquid.

In addition, part of the liquid rushes to the central region, since the spoiler rib on the side wall of the cup body extends to the bottom of the cup body, the flow rate of this part of the cleaning liquid becomes greater. In addition, when the crushing cutter rotates at a high speed, the central region of the crushing cutter is in a vacuum state, at this time, the motor shaft and part of the crushing cutter in the vacuum region may not be washed by the water flow, while bean dregs are more likely to be bonded in this region due to high temperature during pulping, therefore, by extending the spoiler rib on the side wall of the cup body to the bottom of the cup body, the motor shaft and the crushing cutter in the vacuum region can be effectively cleaned.

If the spoiler rib does not extend to the bottom of the cup body, the liquid flow below the spoiler rib may move circumferentially, and the scouring effect of the liquid flow on the motor shaft and the crushing cutter is poor. In this case, it is necessary to define a relationship between the spoiler rib and the crushing cutter, so as to ensure a certain crushing effect.

For the present application, the food processor is a food processor that can make liquid drinks such as soybean milk and the like. Those skilled in the art should understand that the present application includes but is not limited to the solutions described in the drawings and the above specific embodiments. Any modifications that do not deviate from functions and structural principles of the present application are included in the scope of the claims.

The invention claimed is:

1. A self-cleaning method for a food processor, the food processor comprising a cup body, a cup lid, and a crushing cutter, wherein a crushing cavity is defined by the cup lid and the cup body, and a volume of the crushing cavity is V1; wherein
the self-cleaning method comprises a cleaning process, and the cleaning process comprises at least two times of injecting cleaning water into the cup body, wherein in any one of the at least two times of injecting cleaning water, a volume of the cleaning water is greater than or equal to 0.2V1 and smaller than or equal to 0.6V1; wherein
the cleaning process comprises:
an infiltration stage, wherein the infiltration stage comprises one of the at least two times of injecting cleaning water, driving, by the crushing cutter, the cleaning water to scour an inner wall of the crushing cavity, and discharging the cleaning water;
a steaming stage, wherein the steaming stage comprises steaming the inner wall of the crushing cavity by steam, to soften residues left on the inner wall of the crushing cavity; and
a cleaning stage performed after the steaming stage, wherein the cleaning stage comprises another one of the at least two times of injecting cleaning water, driving, by the crushing cutter, the cleaning water to scour the inner wall of the crushing cavity, and discharging the cleaning water; and wherein
the crushing cutter comprises multiple blades, and the multiple blades are arranged on different planes, a height of a blade tip which is at a maximum distance from a bottom of the cup body is h1, and a height of another blade tip which is at a minimum distance from the bottom of the cup body is h2, in the infiltration stage, a water level in the cup body is h01, wherein $h1 \geq h01 > h2$.

2. The self-cleaning method according to claim 1, wherein the food processor further comprises a steam generator, and the steaming stage further comprises: generating the steam by the steam generator, and introducing the steam into the crushing cavity; or,
the cup body is provided with a heating device, and the steaming stage further comprises: generating the steam by heating the cleaning water in the cup body by the heating device.

3. The self-cleaning method according to claim 1, wherein the infiltration stage comprises: heating the cleaning water in the cup body to a temperature T, and wherein the temperature T is less than a boiling temperature of the cleaning water.

4. The self-cleaning method according to claim 1, wherein the infiltration stage comprises: injecting the cleaning water into the cup body and driving the cleaning water by the crushing cutter to scour the inner wall of the crushing cavity for a plurality of times; and discharging the cleaning water out of the cup body after each time of scouring is completed.

5. The self-cleaning method according to claim 1, wherein a water outlet is provided in the crushing cavity, the water outlet faces the inner wall of the crushing cavity, and the cleaning process comprises: spraying water from the water outlet, to scour and clean the inner wall of the crushing cavity.

6. The self-cleaning method according to claim 1, wherein a liquid level of the cleaning water in the cup body in the cleaning stage is a, and wherein $h1 \leq a \leq 3h1$.

7. The self-cleaning method according to claim 5, wherein the food processor further comprises a pressure device in communication with the water outlet through a first pipeline, and in the process of spraying water from the water outlet, the water is sprayed under pressure intermittently.

\* \* \* \* \*